United States Patent
Anderson et al.

(10) Patent No.: US 11,379,978 B2
(45) Date of Patent: Jul. 5, 2022

(54) MODEL TRAINING APPARATUS AND METHOD

(71) Applicant: CANON MEDICAL SYSTEMS CORPORATION, Otawara (JP)

(72) Inventors: Owen Anderson, Edinburgh (GB); Aneta Lisowska, Edinburgh (GB); Alison O'Neil, Edinburgh (GB); Keith Goatman, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/928,180

(22) Filed: Jul. 14, 2020

(65) Prior Publication Data
US 2022/0020142 A1   Jan. 20, 2022

(51) Int. Cl.
*G06T 7/00* (2017.01)
*G06N 3/08* (2006.01)
(Continued)

(52) U.S. Cl.
CPC ......... *G06T 7/0012* (2013.01); *G06N 3/0454* (2013.01); *G06N 3/08* (2013.01);
(Continued)

(58) Field of Classification Search
CPC . G06T 2207/20081; G06T 2207/20084; G06T 2207/10081; G06T 2207/10028; G06T 7/11; G06T 7/12; G06T 7/0012; G06T 7/70; G06T 2200/24; G06T 2207/10016; G06T 2207/10101; G06T 2207/10132; G06T 2207/30004; G06T 2207/30036; G06T 2207/30196;
(Continued)

(56) References Cited

U.S. PATENT DOCUMENTS

| 10,387,773 B2 | 8/2019 | Yan et al. |
| 2009/0080731 A1 | 3/2009 | Krishnapuram et al. |

(Continued)

FOREIGN PATENT DOCUMENTS

WO   WO 2019/127108 A1   7/2019

OTHER PUBLICATIONS

Fu, R. et al., "CNN with coarse-to-fine layer for hierarchical classification," IET Computer Vision, vol. 12, Issue 6. 2018, 8 pages.
(Continued)

*Primary Examiner* — Ajibola A Akinyemi
(74) *Attorney, Agent, or Firm* — Oblon, McClelland, Maier & Neustadt, L.L.P.

(57) ABSTRACT

A medical image processing apparatus includes processing circuitry configured to apply a first trained model to input image data to obtain a first output based on the input data, where the input data includes clinical data. The processing circuitry is further configured to apply a second trained model to the input data to obtain a second output based on the input data, where the first trained model and the second trained model have been trained in dependence on a hierarchical relationship between the first output and the second output. The hierarchical relationship includes at least one of: a spatial hierarchy, a temporal hierarchy, an anatomical hierarchy, and a hierarchy of clinical conditions.

20 Claims, 12 Drawing Sheets

(51) Int. Cl.
*G06N 3/04* (2006.01)
*G06T 7/13* (2017.01)

(52) U.S. Cl.
CPC ...... *G06T 7/13* (2017.01); *G06T 2207/20081* (2013.01); *G06T 2207/20084* (2013.01)

(58) Field of Classification Search
CPC .................. G06T 7/143; G06T 7/248; G06T 2207/10021; G06T 2207/10024; G06T 2207/10088
USPC ........................................................ 382/128
See application file for complete search history.

(56) References Cited

U.S. PATENT DOCUMENTS

| | | |
|---|---|---|
| 2012/0195495 A1 | 8/2012 | Shiell et al. |
| 2013/0136322 A1 | 5/2013 | Zhan et al. |
| 2018/0225822 A1 | 8/2018 | Zhou et al. |
| 2018/0240235 A1 | 8/2018 | Mazo |
| 2018/0240551 A1 | 8/2018 | Perrey et al. |
| 2018/0360313 A1 | 12/2018 | Zhang |
| 2019/0304092 A1 | 10/2019 | Akselrod-Ballin et al. |
| 2021/0133588 A1* | 5/2021 | Wong ..................... G06N 3/088 |
| 2021/0133976 A1* | 5/2021 | Carmi ..................... G06N 3/08 |

OTHER PUBLICATIONS

"3d printing all Alzheimer atrophy biomarker brain challenge cross-sectionalarea ct dementia epilepsy filling gm heart hippocampus image longitudinal mri multiplesclerosis muscle neuromuscular parcellation probabilistic profiling pseudoct registration reporting segmentation spinalcord stl syntheses vessels wm," CMIC—NiftyWeb http://niftyweb.cs.ucl.ac.uk/, Apr. 15, 2020, 6 pages.

Xue, Y. et al., "SegAN: Adversarial Network with Multi-scale $L_1$ Loss for Medical Image Segmentation," Neuroinformatics, 2018, 2018. doi: 10.1007/s12021-018-9377-x, 9 pages.

Yan Z. et. al., "HD-CNN: Hierarchical Deep Convolutional Neural Networks for Large Scale Visual Recognition." 2015 IEEE International Conference on Computer Vision, ICCV 2015, Dec. 7-13, 2015, 9 pages.

* cited by examiner

MODEL TRAINING APPARATUS AND METHOD

FIELD

Embodiments described herein relate generally to training of models, for example training of models using a hierarchical relationship between outputs of the models.

BACKGROUND

It is known to train machine learning algorithms to process data, for example medical image data. The machine learning algorithms may comprise deep learning models.

Typically, a deep learning model may be trained to perform a specific task. For example, the deep learning model may be trained on training data comprising a plurality of training image data sets. Some or all of the training image data sets may be labelled with information that is relevant to the task to be learned.

In the case where there are multiple tasks to be performed on an image data set, a respective deep learning model may be trained to perform each task.

Effective transfer of knowledge between related tasks remains a challenge in deep learning. In some circumstances, jointly modelling related tasks may result in increased algorithm performance. See, for example, Fu et al 'CNN with coarse-to-fine layer for hierarchical classification', 2017, IET Computer Vision, 2018, 12, (6), p. 892-899.

The tasks of lung segmentation and lung nodule detection may be considered to be related tasks. The tasks of lung segmentation and lung nodule detection are related in that a lung nodule must occur within a lung.

Current deep learning systems may be unable to naturally capture high-level relationships, for example the relationship that a lung nodule always resides within the lung.

Transfer learning, multi-task learning and alternated training are methods that attempt to use the relationship between related tasks to enhance algorithm performance.

Transfer learning, multi-task learning and alternated training each rely on a deep learning algorithm learning a relationship between tasks internally, from training data. Although these approaches may offer some utility in terms of creating more robust feature representations, it has been found that they rarely result in the utilization of high-level task relationships, for example the understanding that a lung nodule can only exist within the lungs.

FIG. 1 schematically illustrates two tasks to be performed by one or more trained models. Input data 10 is represented by a cloud shape in FIG. 1. A result 12 of a first task is illustrated by a circle. A result 14 of a second task is illustrated by a square positioned inside the circle. FIG. 1 therefore schematically represents a scenario in which a result 14 of a second task is contained within a result 12 of a first task. For example, the first task may be lung segmentation and the second task may be lung nodule detection. The first result may be a lung and the second task may be a lung nodule contained within the lung.

FIG. 2 schematically illustrates the use of a single multi-task model 20 to perform the tasks illustrated in FIG. 1. Input data 10 is input to the multi-task model 20. The multi-task 20 outputs the result 12 of the first task and the result 14 of the second task.

SUMMARY

In a first aspect, there is provided a processing apparatus comprising processing circuitry configured to: apply a first trained model to input data to obtain a first output based on the input data, wherein the input data comprises clinical data; and apply a second trained model to the input data to obtain a second output based on the input image data; wherein the first trained model and the second trained model have been trained in dependence on a hierarchical relationship between the first output and the second output. The hierarchical relationship may comprise a spatial hierarchy. The hierarchical relationship may comprise a temporal hierarchy. The hierarchical relationship may comprise an anatomical hierarchy. The hierarchical relationship may comprise a hierarchy of clinical conditions.

The input data may comprise medical image data.

The first output may relate to a first object. The second output may relate to a second object. The hierarchical relationship between the first output and the second output may comprise a spatial hierarchy in which the second object is included within a boundary of the first object.

The first object may comprise a first anatomical structure. The second object may comprise a second anatomical structure The first output may comprise a first time period associated with a first type of clinical condition. The second output may comprise a second time period associated with a second type of clinical condition. The hierarchical relationship between the first output and the second output may comprise a temporal hierarchy in which the second time period is included within the first time period.

A process of training the first model and the second model may comprise providing feedback to the first model when an output of the second model is incorrect.

The processing circuitry may be configured to multiply the first output and the second output to obtain a combined output.

The processing circuitry may be further configured to apply at least one additional first trained model to the input data. The obtaining of the first output may comprise combining an output of the first trained model with an output of the additional first trained model.

The processing circuitry may be further configured to apply at least one additional second trained model to the input data. The obtaining of the second output may comprise combining an output of the second trained model with an output of the additional second trained model.

The processing circuitry may be further configured to display the first output and/or the second output and/or the combined input on a display screen.

In a further aspect, which may be provided independently, there is provided a processing method comprising: applying a first trained model to input data to obtain a first output based on the input data, wherein the input data comprises clinical data; and applying a second trained model to the input data to obtain a second output based on the input data; wherein the first trained model and the second trained model have been trained in dependence on a hierarchical relationship between the first output and the second output. The hierarchical relationship may comprise a spatial hierarchy. The hierarchical relationship may comprise a temporal hierarchy. The hierarchical relationship may comprise an anatomical hierarchy. The hierarchical relationship may comprise a hierarchy of clinical conditions.

The input data may comprise medical image data.

In a further aspect, which may be provided independently, there is provided a processing apparatus comprising processing circuitry configured to perform a training process comprising: training a first model to obtain a first output from input data, wherein the input data comprises clinical data; and training a second model to obtain a second output from the input data; wherein training of the first model and of the second model is in dependence on a hierarchical relationship between the first output and the second output. The hierarchical relationship may comprise a spatial hierarchy. The hierarchical relationship may comprise a temporal hierarchy. The hierarchical relationship may comprise an anatomical hierarchy. The hierarchical relationship may comprise a hierarchy of clinical conditions.

The input data may comprise medical image data.

The first output may relate to a first anatomical structure. The second output may relate to a second anatomical structure. The hierarchical relationship between the first output and the second output may comprise a spatial hierarchy in which the second anatomical structure is included within a boundary of the first anatomical structure.

The first output may comprise a first time period associated with a first type of clinical condition. The second output may comprise a second time period associated with a second type of clinical condition. The hierarchical relationship between the first output and the second output may comprise a temporal hierarchy in which the second time period is included within the first time period.

The training process may comprises alternating of a) and b):—
  a) training the first model in isolation;
  b) jointly training the first model and the second model.

The joint training of the first model and the second model may comprise joining an output of the first model and an output of the second model by a multiplication operation to obtain a combined input.

The joint training of the first model and the second model may comprise providing feedback to the first model when an output of the second model is incorrect.

The training of the first model to obtain a first output from input data may comprise training the first model to perform a first task. The first task may comprise at least one of: pixel- or voxel-level classification, segmentation, bounding box regression, region detection, image level classification.

The training of the second model to obtain a second output from the input data may comprise training the second model to perform a second task. The second task may comprise at least one of: pixel- or voxel-level classification, segmentation, bounding box regression, region detection, image level classification.

The training of the first model may be performed using a first training data set. The training of the second model may be performed using a second, different training data set. The first training data set may comprise data that is labelled with ground truth values for the first output. The second training data set may comprise data that is labelled with ground truth values for the second output.

The processing circuitry may be further configured to pre-train the first model and/or the second model.

The processing circuitry may be further configured to train at least one further model to obtain at least one further output from the input data. The training of the at least one further model may be in dependence on a hierarchical relationship between the first output, the second output, and the at least one further output.

The processing circuitry may be further configured to train at least one additional first model to obtain the first output. The processing circuitry may be further configured to train at least one additional second model to obtain the second output.

In a further aspect, there is provided a method for training a first model and a second model using a training process, the training process comprising: training the first model to obtain a first output from input data, wherein the input data comprises clinical data;

and training the second model to obtain a second output from the input data; wherein training of the first model and of the second model is in dependence on a hierarchical relationship between the first output and the second output. The hierarchical relationship may comprise a spatial hierarchy. The hierarchical relationship may comprise a temporal hierarchy. The hierarchical relationship may comprise an anatomical hierarchy. The hierarchical relationship may comprise a hierarchy of clinical conditions.

The input data may comprise medical image data.

In a further aspect, which may be provided independently, there is provided a method for training a deep learning model architecture using back propagation comprising:
  1. A plurality of image interpretation tasks, wherein the relationships between the tasks is hierarchical in nature;
  2. A plurality of deep learning neural network models that perform the image interpretation tasks;
  3. Where the model outputs are joined by successive hierarchical weighting;
  4. During training the training alternates between models after each training batch;
  5. During inference the model outputs are simply joined by successive hierarchical weighting.

The task could be voxel level classification (segmentation), bounding box regression, region detection, image level classification, or a mixture of these. One or more of the models may have been pre-trained prior to Hierarchical Multi-task Transfer by Model Symbiosis. More than one model may be applied to each image interpretation task.

In a further aspect, which may be provided independently, there is provided a processing apparatus comprising processing circuitry configured to: apply a neural network to input data, wherein the neural network including a first model and second model, wherein the first model outputs a first output based on the input data, and, wherein the second model outputs a second output based on the input data, wherein the second output has a hierarchical relationship with the first output.

The first and second model may be configured to give a feedback to complementary model when the output of first or second model is incorrect.

The hierarchical relationship may be a relationship in which a second object related to the second result is included in a boundary of a first object related to the first result.

In a further aspect, which may be provided independently, there is provided a model training method comprising: training a first model to perform a first image analysis task relating to a first anatomical structure; and training a second model to perform a second image analysis task relating to a second anatomical structure, wherein the first anatomical structure and the second anatomical structure have a spatially hierarchical relationship such that the second anatomical structure, if present, occurs anatomically within the first anatomical structure; the training of the first and second model comprising alternating of a) and b):—
  a) training the first model in isolation;
  b) jointly training the first and second model;
  thereby training the first model and second model to conform to the spatially hierarchical relationship.

Each of the first model and second model may comprise a respective deep learning model. The deep learning model may comprise a deep learning neural network.

The spatially hierarchical relationship may be explicitly imposed by hierarchical training. Outputs of the first model and the second model may be joined by successive hierarchical weighting. The joint training of the first and second model may comprise joining the first and second model by a multiplication operation.

The training of the first model and the second model may comprise training the first model on a first dataset labelled for the first image analysis task and training the second model on a second, different dataset labelled for the second image analysis task.

The first image analysis task may comprise at least one of: voxel level classification, segmentation, bounding box regression, region detection, image level classification. The second image analysis task may comprise at least one of: voxel level classification, segmentation, bounding box regression, region detection, image level classification. The first image analysis task may comprise lung segmentation and the second image analysis task may comprise lung nodule detection.

At least one of the first model and second model may have been pre-trained.

Jointly training the first model and second model may comprise at least one of a) to d):— a) in the case of a false positive giving an incorrect prediction for both the first image analysis task and the second image analysis task, backpropagating an error into both the first model and the second model;

b) in the case of a false negative giving a correct prediction for the first image analysis task and an incorrect prediction for the second image analysis task, penalizing the second model;

c) in the case of a false negative giving an incorrect prediction for the first image analysis task and a correct prediction for the first image analysis task, penalizing the first model;

d) in the case of a false negative giving an incorrect prediction for both the first image analysis task and the second image analysis task, penalizing both the first model and the second model.

The method may further comprise training at least one further model to perform at least one further image analysis task relating to at least one further anatomical structure having a spatially hierarchical relationship with the first anatomical structure and/or the second anatomical structure.

The method may further comprise training at least one additional model to perform the first image analysis task, such that a plurality of models are trained to perform the first image analysis task and/or training at least one additional model to perform the second image analysis task, such that a plurality of models are trained to perform the second image analysis task.

In a further aspect, which may be provided independently, there is provided an analysis method comprising: receiving data representative of a subject; and applying to the data a first model and a second model trained in accordance with a method as claimed or described herein to perform the first analysis task relating to the first anatomical structure and the second analysis task relating to the second anatomical structure. The data may comprise image data, for example medical image data.

The applying of the first model and the second model may comprise: obtaining an output of the first model; obtaining an output of the second model; processing the output of the first model to determine information regarding the first anatomical structure; and multiplying the output of the first model and the output of the second model, and processing a result of the multiplying to determine information regarding the second anatomical structure.

Features in one aspect may be provided as features in any other aspect as appropriate. For example, features of a method may be provided as features of an apparatus and vice versa. Any feature or features in one aspect may be provided in combination with any suitable feature or features in any other aspect.

BRIEF DESCRIPTION OF THE DRAWINGS

Embodiments are now described, by way of non-limiting example, and are illustrated in the following figures, in which.

DETAILED DESCRIPTION

Figure 1:
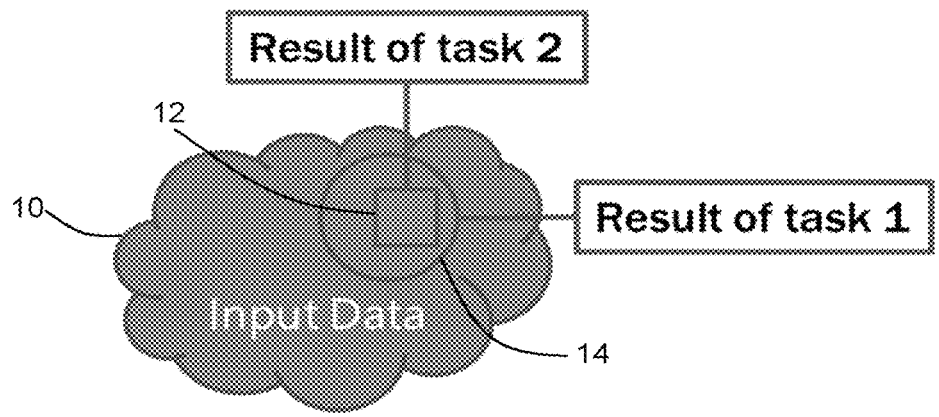
FIG. 1 schematically illustrates a set of input data and results of a first task and a second task.
Figure 2:
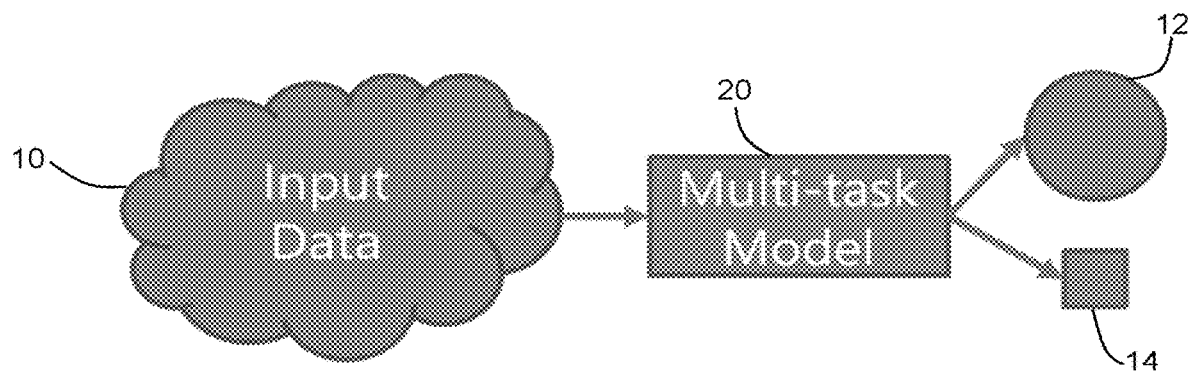
FIG. 2 schematically illustrates use of a multi-task model to perform the first task and the second task.
Figure 3:
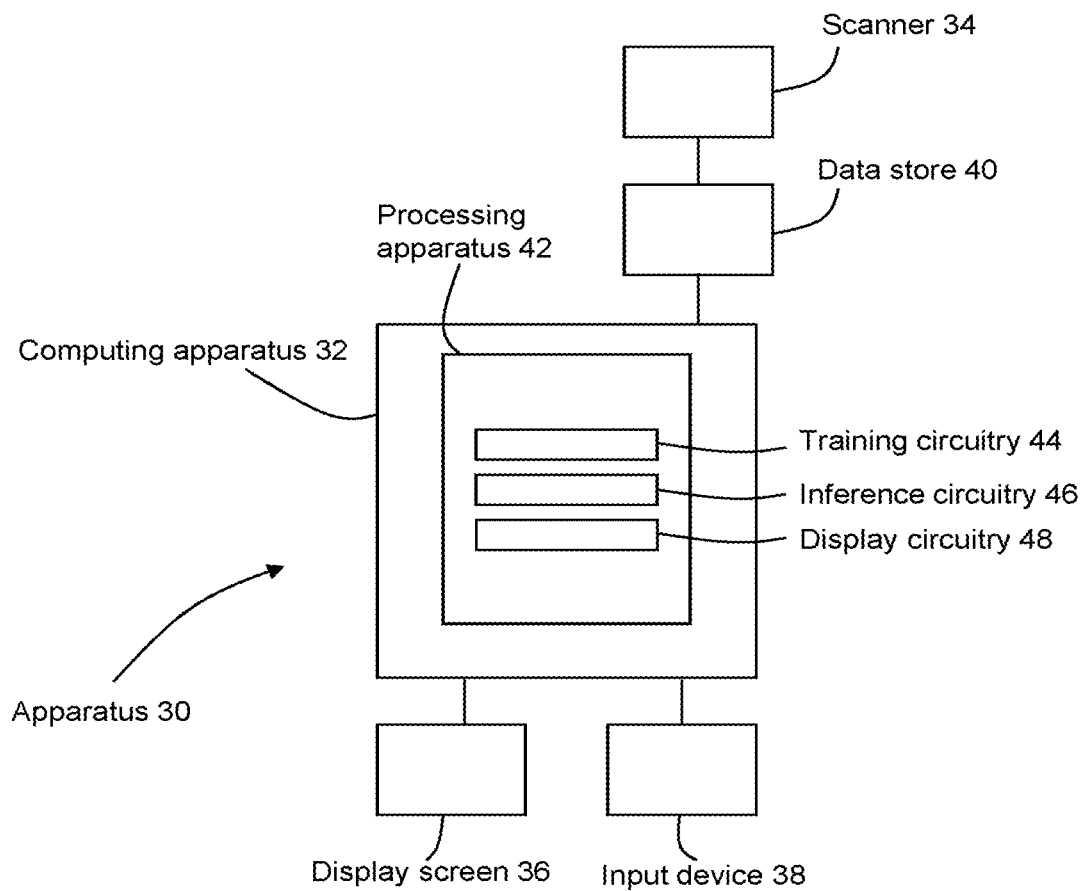
FIG. 3 is a schematic diagram of an apparatus in accordance with an embodiment.

An apparatus 30 according to an embodiment is illustrated schematically in FIG. 3. The apparatus 30 is configured to train at least two models (for example, at least two neural networks) to perform at least two tasks. The at least two tasks may be referred to as image interpretation tasks. The at least two tasks have a hierarchical relationship.

In the present embodiment, the apparatus is also configured to apply the trained models to perform the at least two tasks. In other embodiments, a different apparatus or apparatuses may be used to apply the trained models.

The apparatus 30 comprises a computing apparatus 32, in this case a personal computer (PC) or workstation. The apparatus 30 is connected to at least one scanner 34 via a data store 40. The apparatus 30 is also connected to one or more display screens 36 and an input device or devices 38, such as a computer keyboard, mouse or trackball.

The at least one scanner 34 may comprise any scanner that is configured to perform medical imaging. The or each scanner 34 is configured to generate medical image data, which may comprise two-, three- or four-dimensional data in any imaging modality. For example, the scanner 34 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner.

Image data sets obtained by the at least one scanner 34 are stored in the data store 40 and subsequently provided to computing apparatus 32.

In the present embodiment, the data store 40 stores at least two sets of training data each comprising a respective plurality of training image data sets and associated ground truth data. A first set of training data relates to a first task, and comprises training image data sets that are labelled with ground truth data relating to the first task. A second set of training data relates to a second task, and comprises training image data sets that are labelled with ground truth data relating to the second task. The ground truth data may have been obtained by manual annotation of the training image data set by an expert, or by any suitable automated or semi-automated method.

In the present embodiment, the data store 40 also stores other image data sets that do not have associated ground truth data. The other image data sets are image data sets to which the trained models are to be applied to obtain a desired output, for example a classification, a segmentation, or a region detection.

In an alternative embodiment, training image data sets and/or other image data sets are supplied from one or more further data stores (not shown), which may form part of a Picture Archiving and Communication System (PACS). The data store 40 or further data store may comprise any suitable form of memory storage.

In further embodiments, the training data sets and/or the data sets to which the trained models are to be applied may not comprise image data sets. For example, the data sets may comprise clinical data such as vital sign data, laboratory data, or text data. The models may be trained to provide any appropriate outputs.

Computing apparatus 32 comprises a processing apparatus 42 for processing of data, including image data. The processing apparatus comprises a central processing unit (CPU) and Graphical Processing Unit (GPU). In other embodiments, the processing apparatus may comprise a CPU without a GPU.

The processing apparatus 42 includes training circuitry 44 configured to train at least two models on data from the sets of training data stored in the data store 40, and inference circuitry 46 configured to apply the trained models to unseen data to obtain model outputs. The processing apparatus 42 may further comprise user interface circuitry 48 configured to receive inputs via a user interface and/or to display outputs via the user interface.

In the present embodiment, the circuitries 44, 46, 48 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 32 also includes a hard drive and other components of a PC including RAM, ROM, a data bus, an operating system including various device drivers, and hardware devices including a graphics card. Such components are not shown in FIG. 3 for clarity.

Figure 4:
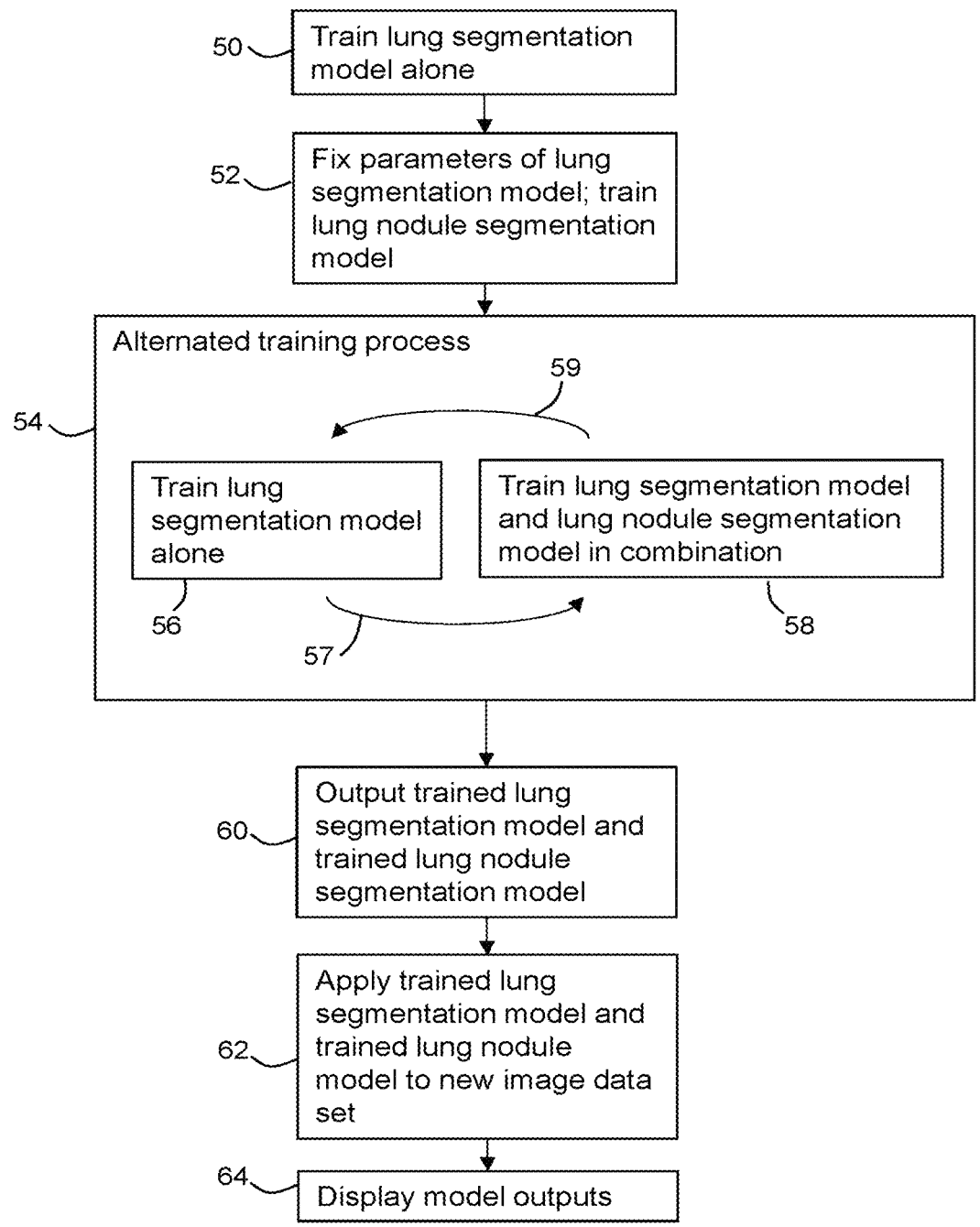
FIG. 4 is a flow chart illustrating in overview a method in accordance with an embodiment.

The apparatus of FIG. 3 is configured to perform a method illustrated in overview in FIG. 4.

At stage 50, the training circuitry 44 receives from data store 40 a first plurality of training image data sets and associated ground truth data. The first plurality of training image data sets is obtained from the first set of training data. Each of the training image data sets comprises a respective set of volumetric medical image data, for example a set of voxel intensities for an array of voxel positions. Each of the training image data sets has been manually classified to obtain respective ground truth data.

In the present embodiment, the ground truth data comprises a respective lung segmentation for each training image data set of the first plurality of training image data sets. The lung segmentation comprises a per-voxel classification of the set of volumetric medical image data to indicate which voxels are representative of lung. The ground truth data may have been obtained in any appropriate manner, for example by manual classification of the training image data sets by an expert. The ground truth data for at least some of the first plurality of training data sets may not comprise data associated with lung nodules, for example lung nodule segmentation data.

The training circuitry 44 receives or generates a first neural network 72. The first neural network 72 may be referred to as a lung segmentation model. In other embodiments, the training circuitry 44 may receive or generate any suitable first model, for example any suitable deep learning model. In some embodiments, the first model does not comprise a neural network.

The first neural network 72 may have been pre-trained before stage 50 commences. For example, the first neural network 72 may have been pre-trained to recognize general image features. The first neural network 72 may have been pre-trained to recognize features of medical images.

Pre-training may comprising training a model on another task, or on another dataset and task. Pre-training may be performed in a supervised fashion in which human-generated ground truth is used to inform updates to model parameters. Pre-training may be performed in an unsupervised fashion (for example, image in-painting or encoder-decoder image reconstruction) in which data used as ground truth can be automatically generated. The use of model pre-training may mean that random network initialization is not used. In some embodiments, pre-training is used for part of a model. For example, pre-training may be used for certain layers of the model. Pre-training may be used for an encoder portion of a model. Pre-training of part of a model may be use when the nature of the pre-training differs from the final task to be performed by the model, for example where the pre-training is on image classification and the final task is image segmentation or vice versa.

In the present embodiment, an encoder of the first neural network 72 is pre-trained on an ImageNet classification task. In other embodiments, any suitable pre-training may be used.

The training circuitry 44 uses the training image data sets and associated ground truth data to train the first neural network 72 to perform the task of lung segmentation.

The first neural network 72 is trained to receive as input an image data set, and to output a lung segmentation comprising a per-voxel classification of the image data set. In the training of the first neural network 72, errors in the task of lung segmentation are determined by comparison with ground truth data. The determined errors are backpropagated into the first neural network 72 to improve the performance of the first neural network 72. The training of the first neural network 72 comprises updating the weights of the first neural network 72. In training, the first neural network 72 may learn to perform a lung segmentation based on any suitable features of the image data set.

Any suitable training method may be used to train the first neural network 72. The training of the first neural network 72 at stage 50 may be considered to be performed in isolation and independently.

An output of stage 50 is a version of the first neural network 72 having updated weights. The weights of the first neural network 72 are fixed at the end of stage 50.

At stage 52, the training circuitry 44 receives from data store 40 a second plurality of training image data sets and associated ground truth data. The second plurality of training image data sets is obtained from the second set of training data. Each of the second plurality of training image data sets comprises a respective set of volumetric medical image data, for example a set of voxel intensities for an array of voxel positions.

In the present embodiment, the ground truth data comprises a respective lung nodule segmentation for each training image data set of the first plurality of training image data sets. The lung nodule segmentation comprises a per-voxel classification of the set of volumetric medical image data to indicate which voxels are representative of lung nodule. The ground truth data may have been obtained in any appropriate manner, for example by manual classification of the training image data sets by an expert. In some embodiments, the ground truth data for at least some of the second plurality of training data sets does not comprise lung segmentation data.

The training circuitry 44 receives or generates a second neural network 82. The second neural network 82 may be referred to as a lung nodule model. In other embodiments, the training circuitry 44 may receive or generate any suitable second model, for example any suitable deep learning model. In some embodiments, the second model does not comprise a neural network.

The second neural network 82 may have been pre-trained before stage 52 commences. For example, the second neural network 82 may have been pre-trained to recognize general image features. The second neural network 82 may have been pre-trained to recognize features of medical images. In the present embodiment, an encoder of the second neural network is pre-trained on an ImageNet classification task. In other embodiments, any suitable pre-training may be used.

The training circuitry 44 uses the training image data sets and associated ground truth data from the second set of training data to train the second neural network 82 to perform the task of lung nodule segmentation. The second neural network 82 is trained in the context of the first neural network 72. During stage 52, the weights of the first neural network 72 are locked.

The second neural network 82 is trained to receive as input an image data set, and to output a lung nodule segmentation comprising a per-voxel classification of the image data set. The output of the second neural network 82 is multiplied by the output of the first neural network 72. In the training of the second neural network 82, errors in the task of lung nodule segmentation are determined by comparison with ground truth data. Errors in the task of lung nodule segmentation are backpropagated into the second neural network 82 to improve the performance of the second neural network 82. In stage 52, the lung nodule model can freely predict lung nodules outside the lung and not be penalized. The training of the second neural network 82 comprises updating the weights of the second neural network 82. In training, the second neural network 82 may learn to perform a lung nodule segmentation based on any suitable features of the image data set.

Any suitable training method may be used to train the second neural network 82. The training of the second neural network 82 at stage 52 may be considered to be performed in isolation and independently, because only the second neural network 82 is updated. The first neural network 72 has locked parameters.

An output of stage 52 is a version of the second neural network 82 having updated weights. The weights of the second neural network 82 are fixed at the end of stage 52.

Stage 50 provides an initial training of the first neural network 72 on the task of performing lung segmentation. Stage 52 provides an initial training of the second neural network 82 on the task of performing lung nodule segmentation. In some embodiments, the initial training of stage 50 and/or the initial training of stage 52 may be omitted from the method of FIG. 4.

Figure 5:
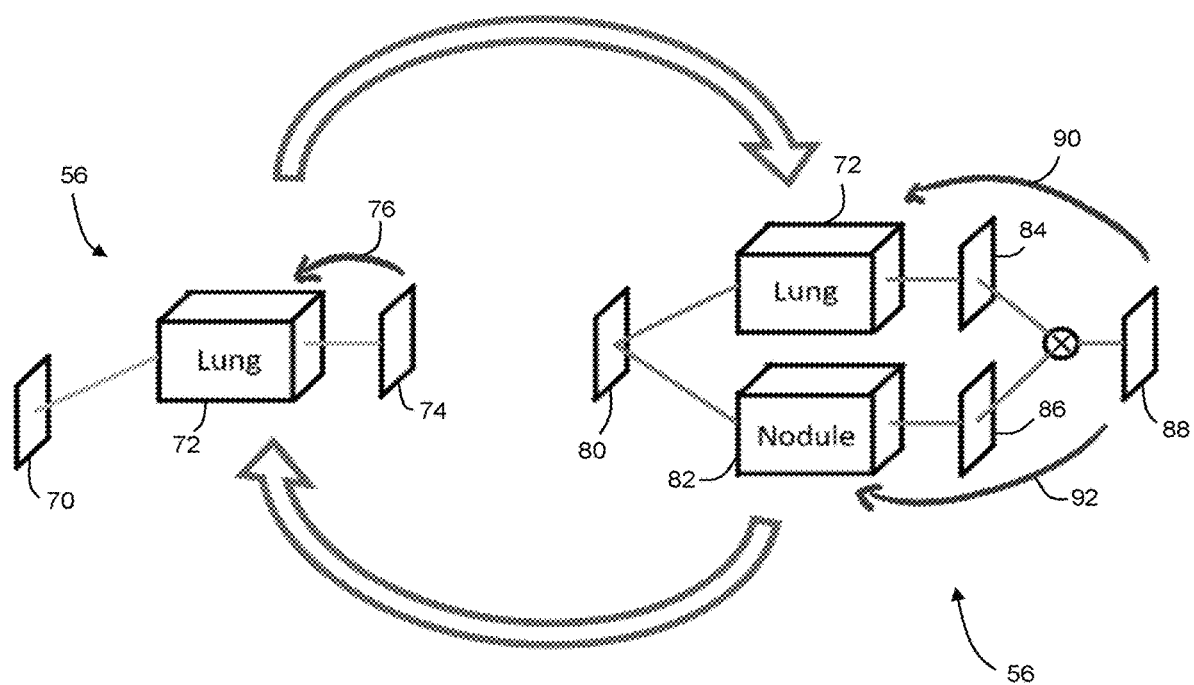
FIG. 5 is a schematic illustration of an alternating training process in accordance with an embodiment.

At stage 54, the training circuitry 44 performs an alternated training process. The alternated training process comprises repeatedly alternating stage 56 and stage 58 of the flow chart of FIG. 4. FIG. 5 is a schematic illustration showing the alternated training process of stage 54 in greater detail.

At stage 56, the training circuitry 44 trains the first neural network 72 alone, using a batch of training image data sets from the first set of training data. The training image data sets used for stage 56 may be different from the training image data sets used for stage 50. Different training image data sets may be used for each instance of stage 56.

The first neural network 72 is trained in isolation on the task of lung segmentation. At the start of a first instance of stage 56, the weights of the first neural network 72 at the start of stage 56 are the weights that were output at the end of stage 50.

FIG. 5 illustrates the training of the first neural network 72. For each of the training image data sets in the batch, the first neural network 72 receives the training image data set 70 and outputs a data set 74 comprising lung segmentation data, for example a per-voxel classification of the input image data sets. Errors in the output of the first neural network 72 are determined by comparison with ground truth data. Errors in the output of the first neural network 72 are backpropagated into the first neural network 72. Backpropagation of errors in the output of the first neural network 72 into the first neural network 72 is illustrated in FIG. 5 by arrow 76.

An output of stage 56 is an updated set of weights for the first neural network 72.

At stage 58, the training circuitry 44 trains the first neural network 72 and the second neural network 82 in combination. The first neural network 72 and the second neural network 82 are joined by a multiplication operation and are jointly trained on the task of lung nodule segmentation. The multiplication may be considered to represent a calculation of the joint probability of the nodule and the lung as follows:

$$P(\text{lung} \cap \text{nodule}) = P(\text{lung})P(\text{nodule}|\text{lung})$$

where P(lung ∩ nodule) is a probability of being both lung and lung nodule, where P(lung) is a probability of being within the lung, and P(nodule|lung) is the probability of being within a nodule, given the condition of being within the lung.

For example, considering an individual voxel, P(lung ∩ nodule) is the probability of the voxel being part of a lung nodule in a lung; P(lung) is a probability of the voxel being within the lung; and P(nodule|lung) is the probability of the voxel being part of a lung nodule, given the condition that the voxel is within the lung.

In a first instance of stage 58, weights for the first neural network 72 at the start of stage 56 are the weights that were output at the end of the first instance of stage 56, and weights for the second neural network 82 are the weights that were output from stage 52.

The training circuitry 44 trains the first neural network 72 to perform lung segmentation and trains the second neural network 82 to perform lung nodule segmentation. The first neural network 72 and second neural network 82 are trained together by multiplying an output of the first neural network 72 and an output of the second neural network 82. Stage 58 is performed using a batch of training image data sets from the second set of training data. The training of the combination of the first neural network 72 and the second neural network 82 may be performed using training data that is labelled only for lung nodules.

Training of the first neural network 72 and second neural network 82 is illustrated in FIG. 5. For each of the training data sets 80 in the current batch, the first neural network 72 and the second neural network 82 each receive the same training data set.

The first neural network 72 produces a first output 84 comprising a lung segmentation. The first output 84 may be written as O1. The second neural network 82 produces a second output 86 comprising a lung nodule segmentation. The second output 86 may be written as O2. The training circuitry 44 multiplies the first output 84 and second output 86 to obtain a third output 88. The third output 88 may be written as O1×O2.

The training circuitry 44 determines errors in the third output 88 by comparison with ground truth data. The training circuitry 44 may determine whether an error in the third output 88 is due to an error in the first output 84 and/or due to an error in the second output 86. Different types of errors are described in more detail below. Errors in the third output 88 are backpropagated into the first neural network 72 and/or the second neural network 86 in dependence on a type of the error. Backpropagation of errors from the third output 88 to the first neural network 72 is represented by arrow 90. Backpropagation of errors from the third output 88 to the second neural network 82 is represented by arrow 92.

For the example tasks of lung segmentation (by the first neural network 72) and lung nodule segmentation (by the second neural network 82), there are four possible extremes of error. In the below discussion, a positive prediction (lung is present, nodule is present) is written as a 1. A negative prediction (lung is not present, nodule is not present) is written as a 0.

A first type of error is a false positive predicted as both lung and nodule. O1=1, O2=1 and O1×O2=1. The prediction of lung and nodule is incorrect. A correct answer would be neither lung nor nodule. In the case of the first type of error, the error is backpropagated into both the first neural network 72 and the second neural network 82, as represented by arrows 90 and 92. Both first neural network 72 and second neural network 82 are penalized.

A second type of error is a false negative that is predicted as lung but not nodule. A correct answer would be both lung and nodule. A classification as lung O1=1 is correct. A classification as not being nodule, O2=0, is incorrect. The multiplied output, O1×O2=0, is incorrect due to the incorrect nodule classification. A correct answer would be both lung and nodule. In the case of the second type of error, the error is backpropagated into the second neural network 82 only, as represented by arrow 92. The second neural network 82 is penalized. The first neural network 72 is not penalized.

A third type of error is a false negative that is predicted as nodule but not lung. A correct answer would be both lung and nodule. A classification as not being lung, O1=0, is incorrect. A classification as nodule, O2=1, is correct. The multiplied output, O1×O2=0, is incorrect due to the incorrect lung classification. In the case of the third type of error, the error is backpropagated into the first neural network 72 only, as represented by arrow 90. The first neural network 72 is penalized. The second neural network 82 is not penalized.

A fourth type of error is a false negative that is predicted as neither nodule nor lung. A correct answer would be both lung and nodule. A classification as not being lung, O1=0, is incorrect. A classification as not being nodule, O2=0, is incorrect. The multiplied output, O1×O2=0, is incorrect due to both the incorrect lung classification and the incorrect nodule classification. In the case of the fourth type of error, the error is backpropagated into the first neural network 72 and the second neural network 82, as represented by arrows 90 and 92. Both the first neural network 72 and the second neural network 82 are penalized.

The lung segmentation model 72 is penalized for exclusions of a lung nodule from within the lung during the joint training of stage 58. The nodule segmentation model 82 is free to predict high probability in areas outside the lung.

Weights of both the first neural network 72 and the second neural network 82 are updated during stage 58. An output of stage 58 is an updated set of weights for the first neural network 72 and an updated set of weights for the second neural network 82.

After stage 58, the alternated training returns to stage 56. At stage 56, the first neural network 72 is trained in isolation on a further batch of image data sets from the first set of training data. After stage 56, the alternated training returns to stage 58. At stage 58, the first neural network 72 and second neural network 82 are trained in combination using a further batch of image data sets from the second set of training data.

Arrows 57 and 59 are used to indicate that, during the alternated training process of stage 54, each instance of stage 56 is followed by an instance of stage 58, and each instance of stage 58 is followed by an instance of stage 56.

The alternation of stages 56 and 58 is repeated until convergence is reached. When convergence is reached, stage 54 is terminated. The weights for the first neural network 72 and second neural network 82 are fixed.

At stage 60, the training circuitry 44 outputs a trained first neural network having the weights that were fixed at the end of stage 54, and a trained second neural network having the weights that were fixed at the end of stage 54.

At stage 62, the inference circuitry 46 receives the trained first neural network 72 and the trained second neural network 82. The inference circuitry 46 receives a new image data set from the data store 40. The new image data set may have been obtained from a scan performed by the scanner 34. The new image data set is an unseen data set that was not part of the first set of training data or the second set of training data.

The inference circuitry 46 applies the trained first neural network 72 to the new image data set to obtain a first output. In the present embodiment, the first output is a lung segmentation. The inference circuitry 46 applies the trained second neural network 82 to the new image data set to obtain a second output. In the present embodiment, the second output is a lung nodule segmentation. The inference circuitry 46 then multiples the first output with the second output to obtain a third output. The third output may be referred to as a combined output. The multiplying of the first output with the second output imposes the hierarchical relationship between the outputs of the first neural network 72 and the second neural network 82. In the present embodiment, the multiplication of the lung segmentation and the lung nodule segmentation imposes the relationship that the lung nodule resides within the boundaries of the lung.

In the present embodiment in which the first output is a lung segmentation and the second output is a lung nodule segmentation, the third output is a lung nodule segmentation on which the spatially hierarchical relationship between lung and nodule has been imposed. The third output may provide an improved lung nodule segmentation.

At stage 64, the display circuitry 48 receives the first output and the third output from the inference circuitry 46. The display circuitry 48 displays the first output and the third output to a user using display screen 36, or on any suitable display or displays. In other embodiments, the first output and third output may not be displayed to a user. For example, the first output, second output and/or third output may be used as a input to a further process.

Figure 6:
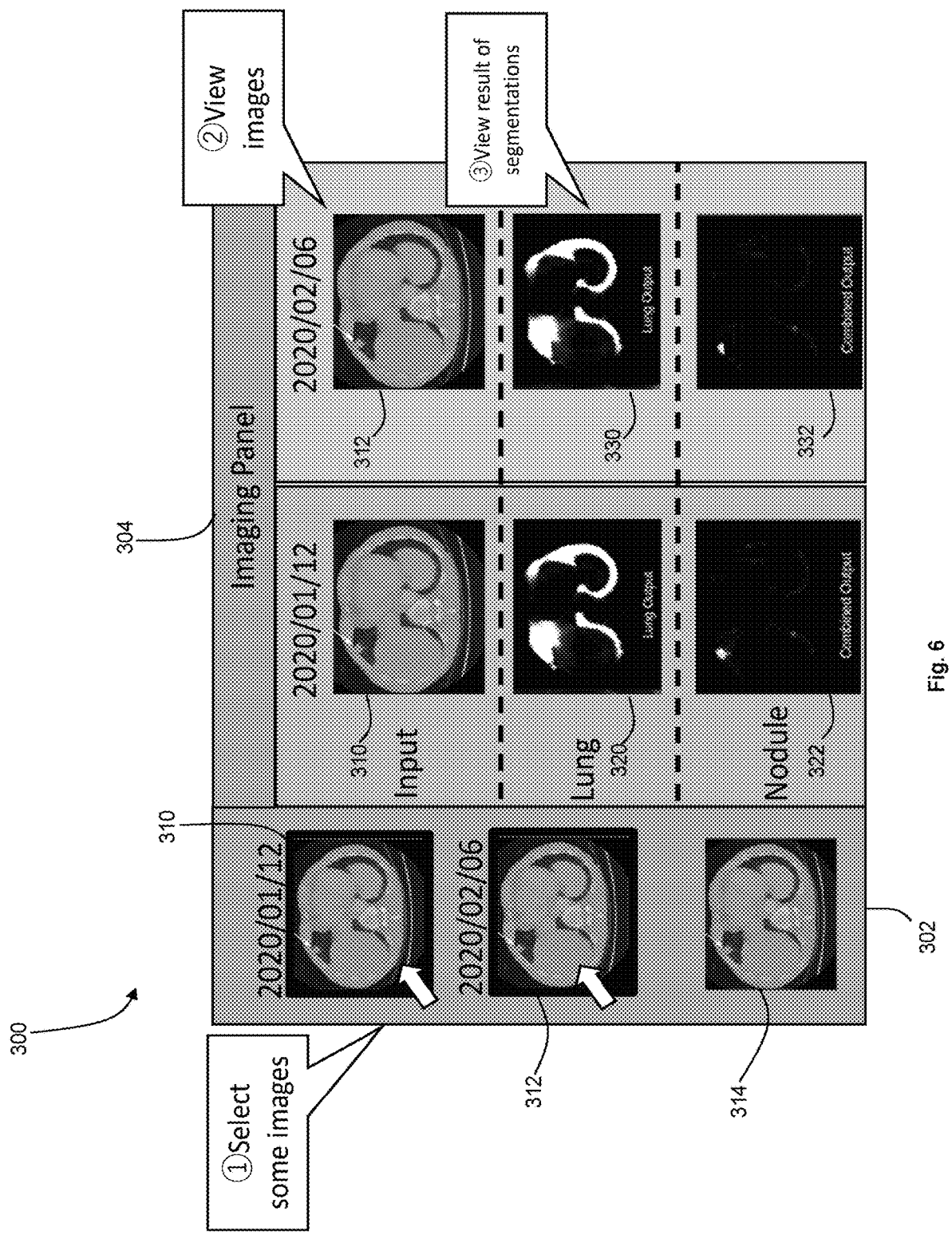
FIG. 6 shows an example of a user interface in accordance with an embodiment.

FIG. 6 illustrates an example of a user interface configured to display results of applying a first trained model and second trained model to lung image data as described above.

A user interface 300 comprises a selection panel 302 and an imaging panel 304. The selection panel 300 displays a plurality of lung images 310, 312, 314 which in the present embodiment are single CT slices. Dates on which the images 310, 312, 314 were acquired are also displayed.

At a first stage 1 of a user interface process, a user selects at least one image from the selection panel 302. In the embodiment shown in FIG. 6, the user selects lung images 310 and 312. The display circuitry 48 displays the lung images 310, 312 in the imaging panel 304. At stage 2 of the user interface process, the user views the lung images 310, 312. The user may review the lung images 310, 312 to manually assess whether any lung nodules are present in the lung images 310, 312.

For each of the lung images 310, 312, the display circuitry 48 displays a corresponding lung segmentation image and nodule segmentation image on the imaging panel 304.

In the case of lung image 310, the display circuitry 48 displays lung segmentation image 320 and nodule segmentation image 322. Lung segmentation image 320 comprises a first output of the first trained model when applied to image data for lung image 310. Nodule segmentation image 322 comprises a combined output of the first trained model and second trained model when applies to image data for lung image 310.

In the case of lung image 312, the display circuitry 48 displays lung segmentation image 330 and nodule segmentation image 332. Lung segmentation image 330 comprises a first output of the first trained model when applied to image data for lung image 312. Nodule segmentation image 332 comprises a combined output of the first trained model and second trained model when applies to image data for lung image 312.

In some embodiments, the trained models are applied to the lung images 310, 312 when the lung images 310, 312 are selected by the user. In other embodiments, the trained models are applied to the lung images 310, 312 in advance. For example, the trained models may be applied to all lung images stored in the data store 40.

At stage 3 of the user interface process, the user views the results of the segmentations. The user views the outputs 320, 330 of the first trained model and the combined outputs 332, 334 of the first trained model and second trained model.

In other embodiments, any suitable display method and user interface may be used. The user may interact with the user interface in any suitable manner.

The method of FIG. 4 provides a method for training and deployment of deep learning algorithms. A deep learning technique for hierarchical tasks is provided. The method of FIG. 4 may be described as hierarchical multi-task transfer by model symbiosis. Multiple models work together in a constructive relationship. Tasks are jointly modelled in a manner that facilitates the transfer of knowledge across the tasks.

The model architecture and training strategy described above in relation to FIG. 4 may together allow two related tasks to be integrated, which may yield an improvement in performance for both tasks.

The method of FIG. 4 may result in a higher sensitivity by the combined model on lung nodule segmentation. The method of FIG. 4 results in lung segmentation and nodule segmentation algorithms that may be considered to be coherent. The training method causes the two models to be forced to abide by the hierarchical structure of the tasks A task relationship of one object residing within the boundaries of another is imposed on a deep learning algorithm. Individual models are joined at the output by a multiplication operation. At inference time (stage 62), this acts as applying a mask. At training time, the method of FIG. 4 allows errors from one task to be used to inform weight updates for the model used for another task, if the prediction by a model violates a hierarchical task relationship.

The model training is alternated between tasks. The model training may also be alternated between data sets. The method of FIG. 4 may be used to leverage multiple datasets with multiple, but related, labels for related tasks. For example, a first set of training data may comprise a lung segmentation data set, and a second set of training data may comprise a nodule segmentation data set. Information captured in one data set may be leveraged to increase performance on the other data set and task. Alternating between data sets may allow the utilization of data that has been incompletely labelled, for example data that does not comprise labels for all of the hierarchical tasks.

In some circumstances, a training process that comprises training each of the models individually before commencing an alternated training process may provide better results than a training process that only comprises alternated training.

The method of FIG. 4 does not rely on the deep learning algorithm learning a relationship between tasks internally, from the data. Instead, a relationship between tasks is imposed as part of a training method.

It has been found that, while known multi-task models may offer some utility in terms of creating more robust feature representations, they rarely result in the utilization of high-level task relationships, for example the understanding that a lung nodule can only exist within the lungs. This may be due to the simplistic nature of deep learning algorithms. The method of FIG. 4 makes use of high-level task relationships which are more rigidly imposed on the training of models, and on the application of trained models.

The method of FIG. 4 is described with reference to the tasks of lung segmentation and lung nodule segmentation. In other embodiments, a hierarchical multi-task transfer method similar to that described with reference to FIG. 4 may be used on any appropriate tasks having outputs that have a hierarchical relationship, for example a spatially hierarchical relationship.

Hierarchical multi-task transfer may be used to enhance algorithm performance. FIGS. 8A to 8F and FIG. 9 show algorithm performance for two example hierarchical tasks, using independent data sets labelled separately for each task.

Figure 7:
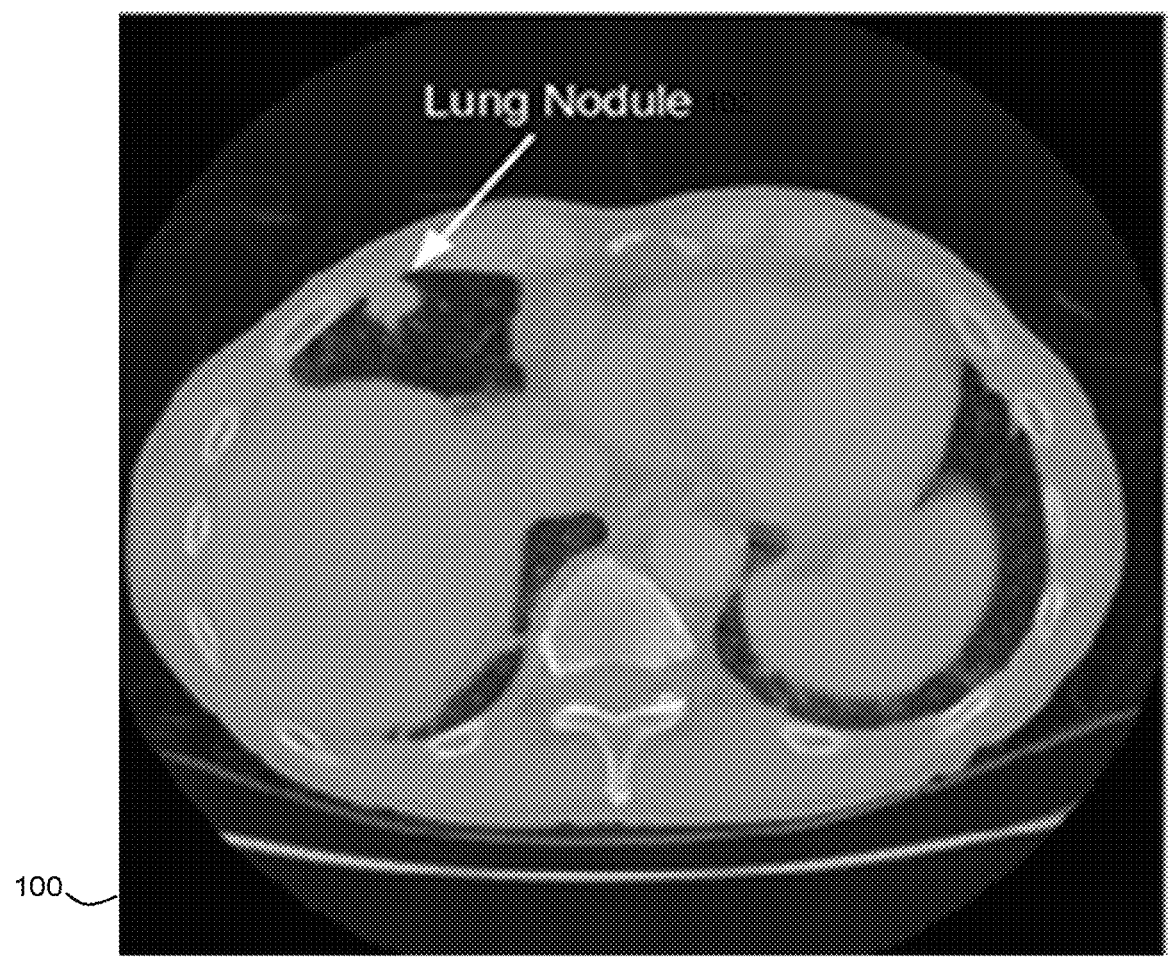
FIG. 7 shows an exemplary medical image.

FIG. 7 shows an exemplary medical image 100. The medical image is a single CT slice. The medical image includes a lung nodule 102.

Figure 8A:
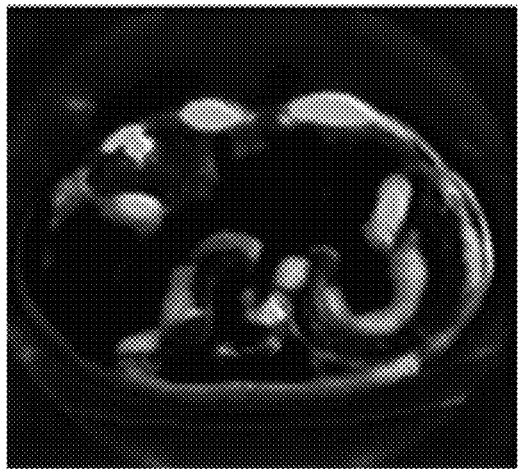
FIG. 8A shows a result of applying a nodule segmentation model to the image of FIG. 7.
Figure 8D:
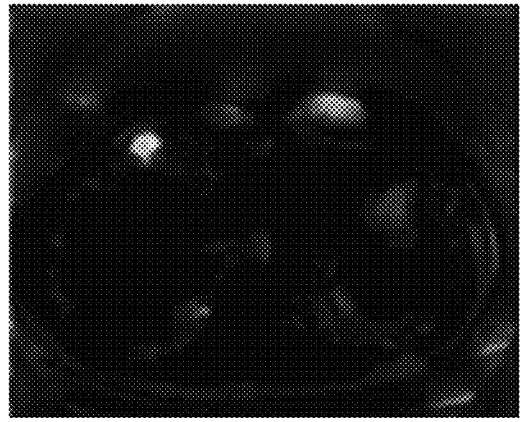
FIG. 8D shows a result of applying a nodule segmentation model to the image of FIG. 7, wherein the nodule segmentation model is trained in accordance with an embodiment.
Figure 8B:
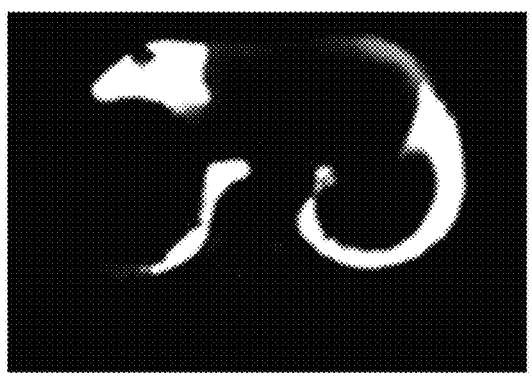
FIG. 8B shows a result of applying a lung segmentation model to the image of FIG. 7.
Figure 8E:
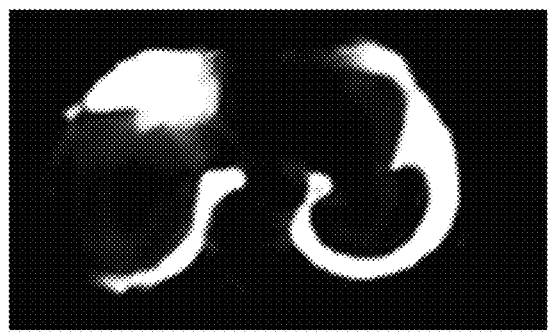
FIG. 8E shows a result of applying a lung segmentation model to the image of FIG. 7 wherein the lung segmentation model is trained in accordance with an embodiment.
Figure 8C:
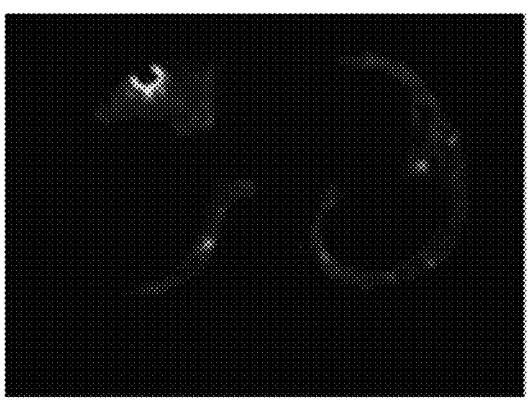
FIG. 8C shows a result of combining the nodule segmentation of FIG. 8A with the lung segmentation of FIG. 8B.

FIGS. 8A to 8C show results of applying a lung segmentation model and a nodule segmentation model to the medical image 100 of FIG. 7. In the method for which results are shown in FIGS. 8A to 8C, no alternated training has been performed on the lung segmentation model and nodule segmentation model. The lung segmentation and nodule segmentation model have been trained independently.

FIG. 8A shows an output of the nodule segmentation model when applied to an image data set corresponding to the image of FIG. 7. FIG. 8B shows an output of the lung segmentation model when applied to the image data set corresponding to the image of FIG. 7. The lung segmentation model has omitted the lung nodule in its segmentation of the lung. FIG. 8C shows a result of multiplying the output of the nodule segmentation model and the output of the lung segmentation model. The nodule is not correctly identified in FIG. 8C.

Figure 8F:
FIG. 8F shows a result of combining the nodule segmentation of FIG. 8D with the lung segmentation of FIG. 8E.

FIGS. 8D to 8F show results of applying a lung segmentation model and nodule segmentation model that have been trained using alternated training as described above with reference to FIG. 4.

FIG. 8D shows an output of the nodule segmentation model that has been trained using alternated training, when applied to the image data set corresponding to the image of FIG. 7. FIG. 8E shows an output of the lung segmentation model that has been trained using alternated training, to the image data set corresponding to the image of FIG. 7. FIG. 8F shows a result of multiplying the output of the nodule segmentation model and the output of the lung segmentation model. In FIG. 8F, the nodule is correctly located inside the lung. It may be seen from FIG. 8E that the lung segmentation model now includes the lung nodule within the area of the lung.

Figure 9:
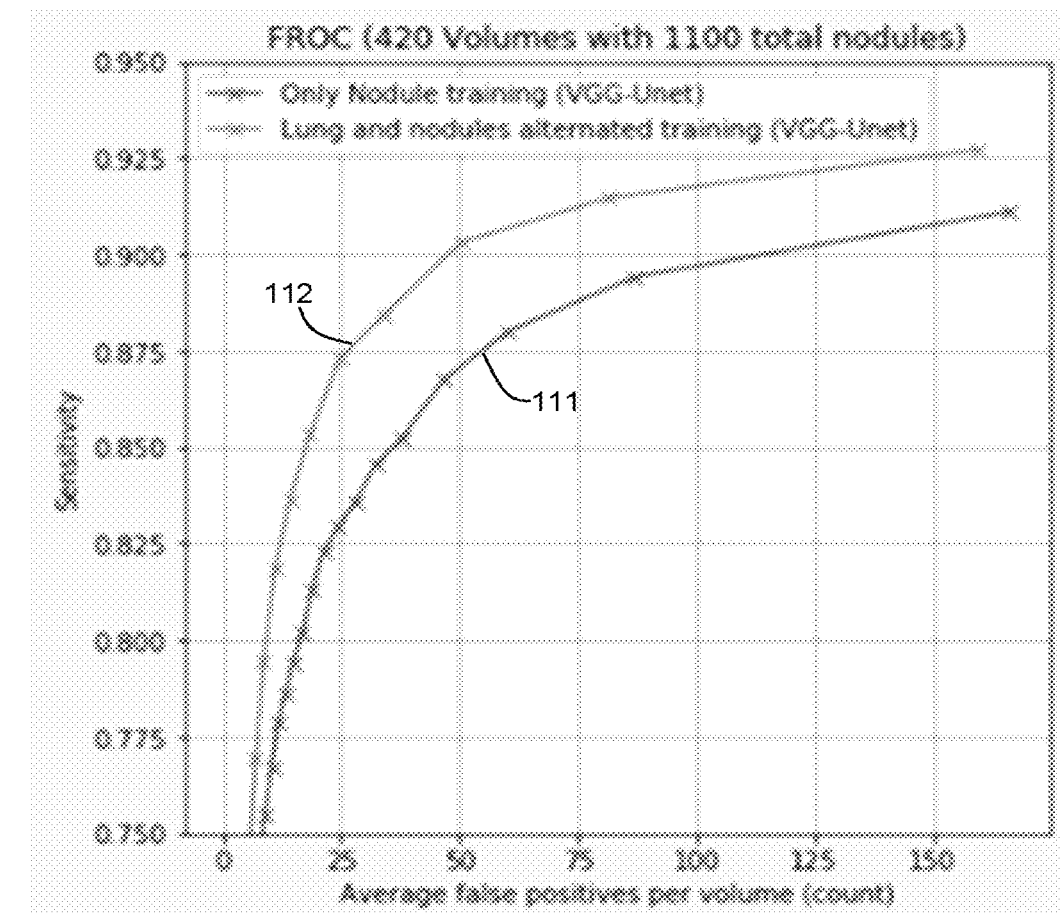
FIG. 9 is a plot comparing numerical performance of models on a nodule segmentation task.

FIG. 9 comprises a plot 110 of numerical performance of two different models on a lung nodule segmentation task. The plot 110 is a Free Receiver Operating Characteristic. A horizontal axis of the plot 110 of FIG. 9 is average false positives per volume (count). A vertical axis of the plot 110 of FIG. 9 is sensitivity.

A first line 111 is representative of the performance of a combined model that has been trained on both the lung segmentation task and the nodule segmentation task. The combined model comprises a lung segmentation model and a nodule segmentation model as described above with reference to FIG. 4.

A second line 112 is representative of the performance of a model that has been trained solely on the nodule segmentation task. A combined model comprising a lung segmentation model and a lung nodule segmentation model is not employed in the model for which performance is shown by line 112. The alternated training method of FIG. 4 is not employed in the model for which performance is shown by line 112.

It may be seen that the combined model (line 111) offers higher sensitivity than the model for which a combined strategy is not employed (line 112). The combined model offers higher sensitivity at all false positive rates.

In the embodiment of FIG. 4, the tasks performed by the models are lung segmentation and lung nodule segmentation. The task relationship is that of a pathology within an organ, which in the case of FIG. 4 is a lung nodule within a lung. In other embodiments, a hierarchical multi-task transfer method corresponding to that described above with reference to FIG. 4 may generally be applied for tasks where one object resides within the boundaries of another. A method used may comprise the method of FIG. 4 with lung segmentation replaced by any suitable first task relating to a first object, and lung nodule segmentation replaced by any suitable second task relating to a second object. Any suitable hierarchy of objects may be used.

A spatially hierarchical task relationship between two tasks may be used to leverage a performance improvement on both tasks. Deep learning algorithms may be created across tasks. The deep learning algorithms may be inherently forced to provide results that are coherent with hierarchical relationships. For example, a first task may relate to a tumor, and a second task to a region of fluid or edema, where the tumor resides within the boundaries of a region of fluid or edema. A first task may relate to the brain, and a second task may related to the hippocampus. For example, the hippocampus may be segmented using the knowledge that it the hippocampus is located within the brain.

In some embodiments, a first task relates to the eye, and a second task relates to the lens of the eye. For example, a first model may segment the entire eye, and a second model may segment the lens of the eye.

In further embodiments, an alternated training method similar to that described above with reference to FIG. 4 may be applied to more than two tasks, where cascaded hierarchical task relationships exist.

Figure 10:
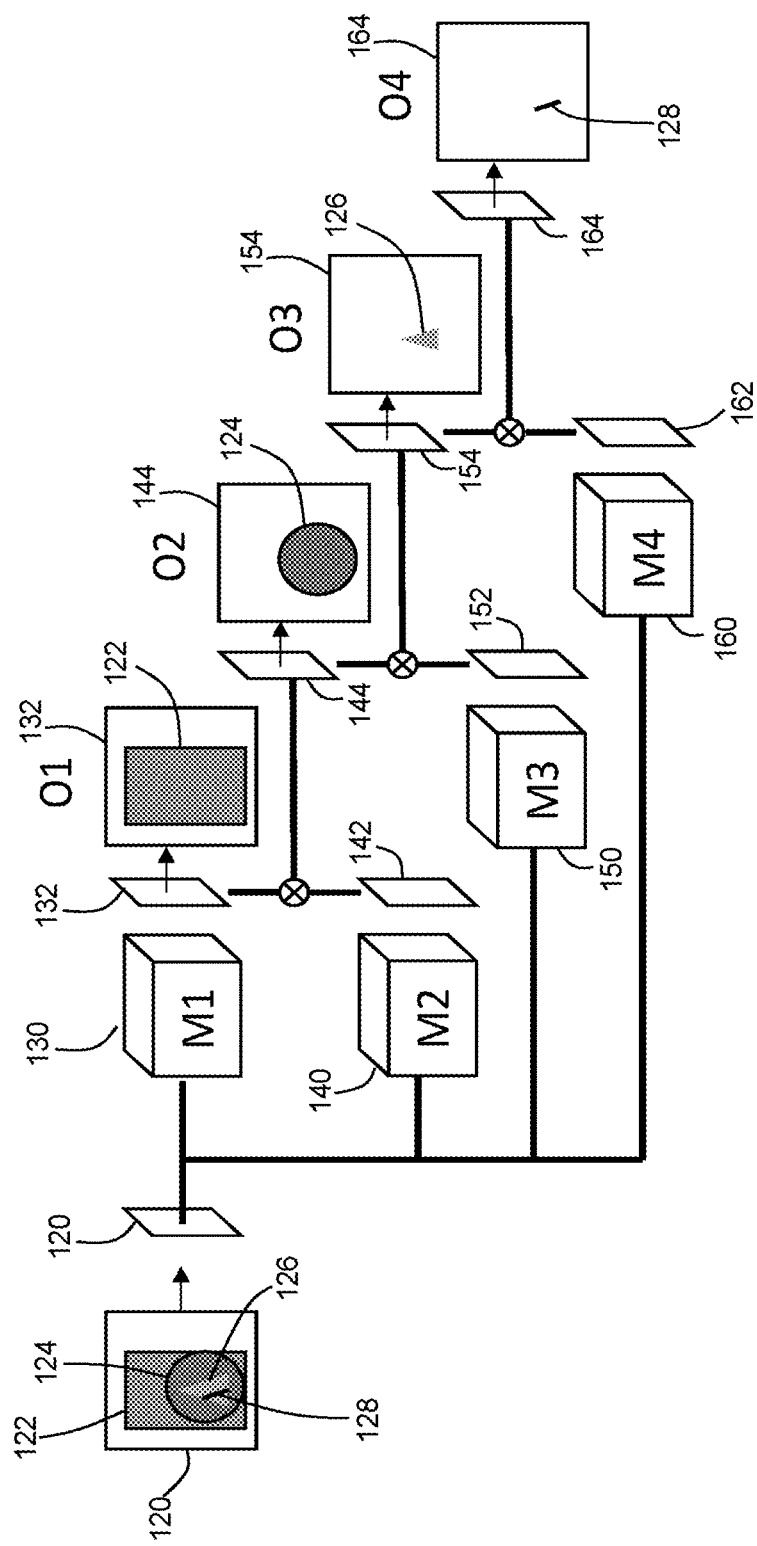
FIG. 10 is a schematic illustration of four cascaded models in accordance with an embodiment.

FIG. 10 is a schematic illustration of a set of four models that are trained to perform four hierarchical segmentation tasks. FIG. 10 shows how the models are cascaded at inference time to obtain four outputs. The model outputs are joined by successive hierarchical weighting.

An input image 120 provided to a cascade of trained models. In FIG. 10, the input image 120 is illustrated twice: once using a symbol for an image similar to that used in FIG. 5, and once as a representation that shows that the image includes first to fourth objects 122, 124, 126, 128. An arrow connects the two illustrations of the input image 120.

The input image 120 includes a first object 122 which is illustrated as a rectangle. The input image 120 further includes a second object 124 which is illustrated as a circle, and which is contained within the boundary of the first object 122. The input image further includes a third object 126 which is illustrated as a triangle, and which is contained within the boundary of the second object 124. The input image further includes a fourth object 128 which is illustrated as a line, and which is contained within the boundary of the third object 126. There is therefore a set of spatially hierarchical relationships between the first object 122, second object 124, third object 126 and fourth object 128.

The objects 122, 124, 126 and 128 are simplified objects used as examples. In embodiments, the first to fourth objects 122, 124, 126, 128 may be any objects having spatially hierarchical relationships. For example the objects 122, 124, 126, 128 may be any suitable anatomical structures having spatially hierarchical relationships.

The inference circuitry 46 applies a first trained model 130 to the input image 120 to generate a first output 132 comprising a segmentation of the first object 122. The first output 132 is illustrated twice in FIG. 10: once as a symbol and once as a representation that shows that the first output 132 is representative of the first object 122.

The inference circuitry 46 applies a second trained model 140 to the input image 120 to generate a second output 142. The inference circuitry 46 multiples the second output 142 with the first output 132 to obtain a first combined output 144. The first combined output 144 comprises a segmentation of the second object 124. The first combined output 144 is illustrated twice in FIG. 10: once as a symbol and once as a representation that shows that the first combined output 144 is representative of the second object 124.

The inference circuitry 46 applies a third trained model 150 to the input image 120 to generate a third output 152. The inference circuitry 46 multiples the third output 152 with the first combined output 144 to obtain a second combined output 154. The second combined output 154 comprises a segmentation of the third object 126. The second combined output 154 is illustrated twice in FIG. 10: once as a symbol and once as a representation that shows that the second combined output 154 is representative of the third object 126.

The inference circuitry 46 applies a fourth trained model 160 to the input image 120 to generate a fourth output 162. The inference circuitry 46 multiples the fourth output 162 with the second combined output 154 to obtain a third combined output 164. The third combined output 164 comprises a segmentation of the fourth object 128. The third combined output 154 is illustrated twice in FIG. 10: once as a symbol and once as a representation that shows that the third combined output 164 is representative of the fourth object 128.

The method of FIG. 10 imposes hierarchical relationships between the outputs of multiple tasks. In other embodiments, the method of FIG. 10 may be used for any suitable number of tasks, as long as the outputs of the tasks have a hierarchical relationship. Individual models are joined at the output by multiplication operations.

Figure 11:
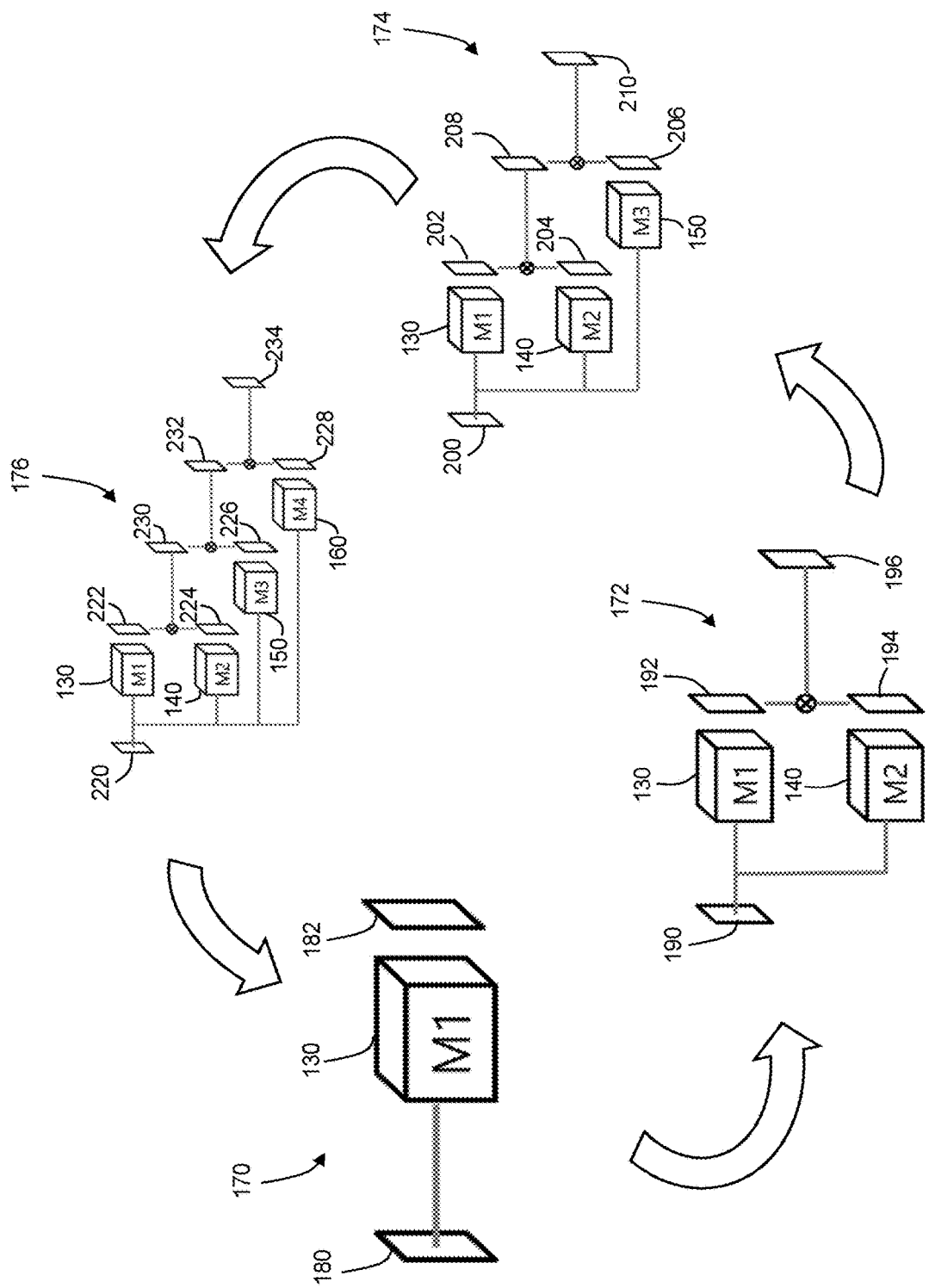
FIG. 11 is a schematic illustration of an alternating training process for training four models in accordance with an embodiment.

FIG. 10 shows how four trained models 130, 140, 150, 160 are cascaded at inference time to generate four outputs on hierarchical segmentation tasks. The models 130, 140, 150, 160 may also be referred to as M1, M2, M3, M4 respectively. FIG. 11 shows a cyclical alternated training process for training the four models used in FIG. 10. The cyclical alternated training process comprises a first stage 170, a second stage 172, a third stage 174, and a fourth stage 176. FIG. 10 shows an example of ordering of stages 170, 172, 174, 176. In other embodiments, training may not be limited to the ordering shown in FIG. 10. Any suitable order may be used.

At stage 170, the training circuitry 44 trains first model 130 to perform a first task, which in the present embodiment is the segmentation of first object 122. The training circuitry inputs first training data 180 to first model 130 to obtain output 182. Errors in output 182 are backpropagated into first model 130. The first model 130 is trained using a batch of first training data comprising image data sets labelled with ground truth segmentations of the first object 122.

At stage 172, the training circuitry 44 trains first model 130 and second model 140 together. The training circuitry 44 inputs second training data 190 to the first model 130 to obtain first output 192. The training circuitry 44 inputs the same second training data 190 to the second model 140 to obtain second output 194. The training circuitry 44 multiplies the first output 192 and second output 194 to obtain a third, combined output 196. Errors in the third output 196 are backpropagated into the first model 130 and/or the second model 140. Backpropagation of errors into the first model 130 and/or the second model 140 may be dependent on a type of error. The combination of the first model 130 and second model 140 is trained using a batch of second training data comprising image data sets labelled with ground truth segmentations of the second object 124.

At stage 174, the training circuitry 44 trains first model 130, second model 140 and third model 150 together. The training circuitry 44 inputs third training data 200 to the first model 130 to obtain first output 202. The training circuitry 44 inputs the same third training data 200 to the second model 140 to obtain second output 204. The training circuitry 44 inputs the same third training data 200 to the third model 160 to obtain third output 206. The training circuitry 44 multiplies the first output 202 and second output 204 to obtain first combined output 208. The training circuitry 44 multiplies first combined output 208 with third output 206 to obtain second combined output 210.

Errors in the second combined output 210 are backpropagated into the first model 130 and/or the second model 140 and/or the third model 150. Backpropagation of errors into the first model 130 and/or the second model 140 and/or third model 150 may be dependent on a type of error. The combination of the first model 130, second model 140 and third model 150 is trained using a batch of third training data comprising image data sets labelled with ground truth segmentations of the third object 126.

At stage 176, the training circuitry 44 trains all four models 130, 140, 150, 160 together. The training circuitry 44 inputs fourth training data 220 to the first model 130 to obtain first output 222. The training circuitry 44 inputs the same fourth training data 220 to the second model 140 to obtain second output 224. The training circuitry 44 inputs the same fourth training data 220 to the third model 150 to obtain third output 226. The training circuitry 44 inputs the same fourth training data 220 to the fourth model 160 to obtain fourth output 228.

The training circuitry 44 multiplies the first output 222 and second output 224 to obtain first combined output 230. The training circuitry 44 multiplies first combined output 210 with third output 226 to obtain second combined output 232. The training circuitry 44 multiplies second combined output 232 with fourth output 228 to obtain third combined output 234.

Errors in the third combined output 234 are backpropagated into the first model 130 and/or the second model 140 and/or the third model 150 and/or the fourth model 160. Backpropagation of errors into the first model 130 and/or the second model 140 and/or third model 150 and/or the fourth model 160 may be dependent on a type of error. The combination of the first model 130, second model 140, third model 150 and 160 is trained using a batch of fourth training data comprising image data sets labelled with ground truth segmentations of the fourth object 128.

After stage 176, the cyclical training process returns to stage 170. The cyclical training process cycles through stages 170, 172, 174 and 176 until convergence is reached. An output of the cyclical training process is the four trained models 130, 140, 150, 160.

In further embodiments, any suitable number of models may be trained to perform any suitable number of tasks. In initial training, the model at the highest level of the hierarchy is trained first, followed by models at lower levels. Models at lower levels are trained to develop a dependence on models that are further up the hierarchy.

In some embodiments, the training circuitry 44 trains more than one model to perform a given task. For example, the training circuitry 44 may train two or more models to perform lung segmentation. The training circuitry 44 may train two or more models to perform lung nodule segmentation. In some embodiments, a training process is repeated to generate a plurality of pairs of lung segmentation and nodule segmentation models. In some embodiments, different combinations of lung segmentation and nodule segmentation models are trained together sequentially.

At inference time, the inference circuitry 46 may combine outputs of the more than one model for each task. For example, the inference circuitry 46 may combine outputs from two lung segmentation models to obtain an overall lung segmentation output. The inference circuitry 46 may combine outputs from two lung nodule segmentation models to obtain an overall lung nodule segmentation output. The overall lung segmentation output and the overall lung nodule segmentation output may then be multiplied together to obtain a combined output.

In many of the embodiments described above, one model is trained to perform lung segmentation and another model is trained to perform lung nodule segmentation. In other embodiments, any two or more models may be trained to perform any suitable tasks. One or more of the tasks may comprise a segmentation of any suitable object, for example any suitable anatomical structure. The segmentation may comprise a pixel-level classification or a voxel-level classification.

In some embodiments, one or more of the tasks comprises a bounding box regression. A bounding box may be positioned around any suitable object, for example any suitable anatomical structure.

In some embodiments, one or more of the tasks comprises a region detection. For example, a region of tissue may be detected. A lung nodule detection task may comprise generating a coordinate at a lung nodule. In another example, a task of detecting the centroid of a tumorous mass may be performed.

In some embodiments, one or more of the tasks comprises an image level classification. For example, a model may be trained to identify whether a given object (for example, a given anatomical structure) occurs within an image data set.

In some embodiments, different models are trained to perform different tasks. For example, one of the models in a hierarchy may be trained to perform a segmentation, and another of the models in the hierarchy may be trained to perform a bounding box regression. In some embodiments, a single model may be trained to perform multiple tasks relating to a single object or to multiple objects.

The tasks for which the models are trained may relate to any suitable objects, for example any suitable anatomical structures. The image data sets may comprise medical image data sets acquired using any suitable modality or modalities, for example CT data, MR data, X-ray data, PET data, or SPECT data sets. The image data sets may be two-dimensional, three-dimensional or four-dimensional. The image data sets may be obtained by imaging any suitable anatomical region of any patient or other subject. The patient or other subject may be human or animal.

In further embodiments, the image data sets may not be medical image data sets. The tasks for which the models are trained may relate to any suitable objects that are present in the image data sets. For example, methods described above may be used on the analysis of natural images. In the context of autonomous vehicles, the tasks of automatically segmenting the road and detecting road marking may be arranged as hierarchical tasks.

In alternative embodiments, a method of hierarchical multi-task transfer by model symbiosis may be performed on any suitable data. In some embodiments, the data on which the models are trained does not comprise image data. In some embodiments, the data on which the models are trained comprises a mixture of image data and non-image data.

Figure 12:
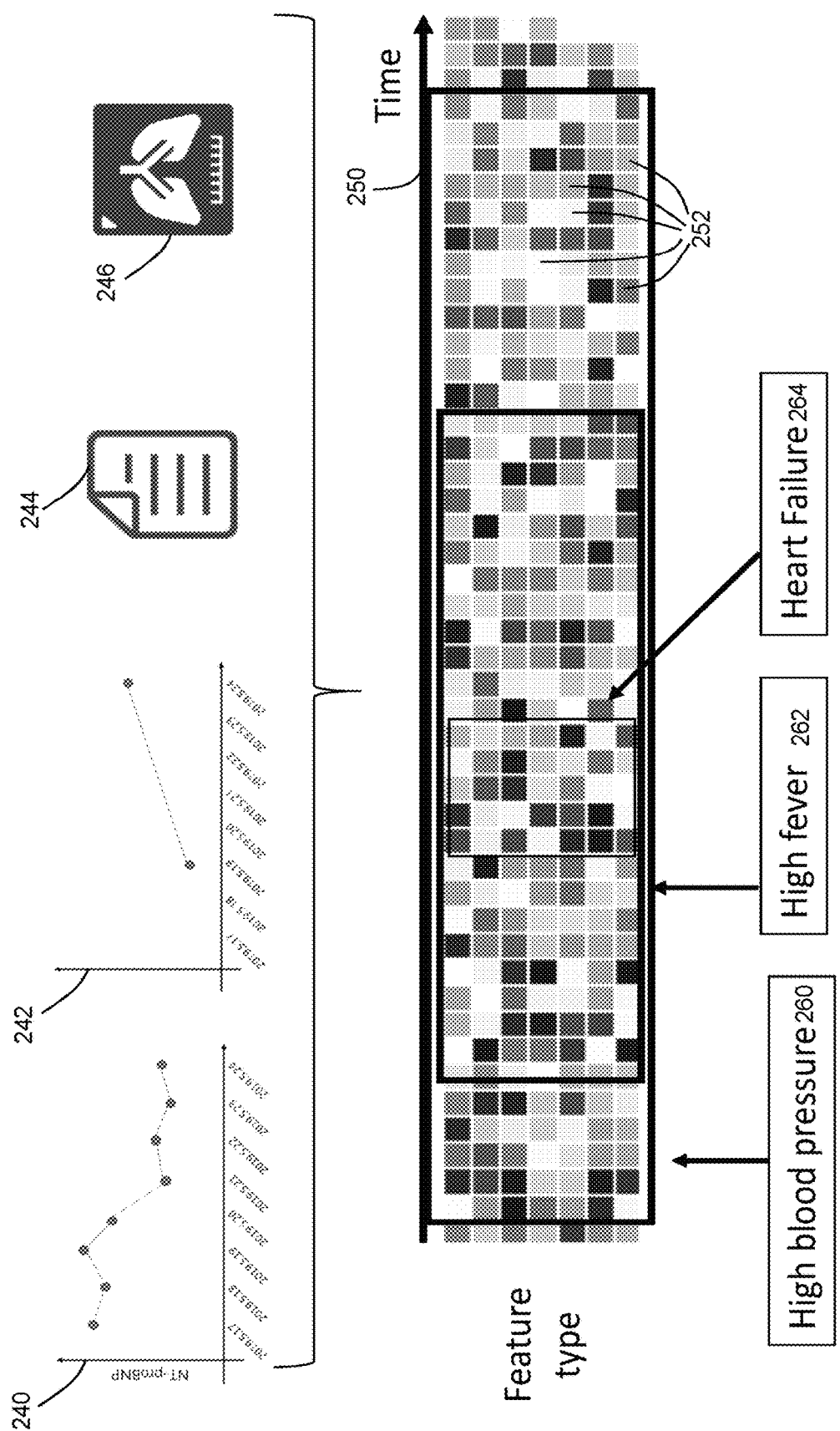
FIG. 12 is a schematic illustration of determining periods of high blood pressure, high fever, and heart failure from clinical data using models trained in accordance with an embodiment.

FIG. 12 illustrates an embodiment using three models that have been trained on clinical data comprising time-series data. The time-series data comprises data that has been acquired at multiple points in time.

The clinical data comprises medical image data. The clinical data may comprise medical image data that has been obtained at multiple points in time, for example on different days.

The clinical data further comprises vital signs data. The vital signs data may comprise, for example body temperature data, blood pressure data, heart rate data and/or respiratory rate data. The vital signs data has been obtained at multiple points in time. For example, the vital signs data may be obtained on an hour-by-hour or minute-by-minute basis.

The clinical data further comprises laboratory data. The laboratory data may have been obtained from any suitable laboratory tests, for example blood tests or urine tests. The laboratory data has been obtained at multiple points in time. For example, the laboratory data may be obtained daily, or at a separation of multiple days.

The clinical data further comprises text data. The text data may comprise, for example, patient medical data. The text data has been obtained at multiple points in time, for example daily.

The clinical data on which the models are trained comprises data from a large number of patients. Ground truth information is provided regarding periods of high blood pressure, high fever, and heart failure occurring in the patients for whom the clinical data is provided.

The training circuitry 44 trains the first model to determine a period of high blood pressure based on clinical time-series data comprising vital signs data, laboratory data, text data and image data. The training circuitry trains the second model to determine a period of high fever based on the same clinical time-series data. The training circuitry trains the third model to determine a period of heart failure based on the same clinical time series.

In the context of the embodiment of FIG. 12, it is assumed that a period of high fever always occurs as part of a period of high blood pressure, but that high blood pressure may occur without high fever. It is assumed that a period of heart failure always occurs within a period of high fever, but that high fever can occur without heart failure. High blood pressure, high fever and heart failure have a temporal hierarchy. Heart failure always occurs at the same time as high fever and high blood pressure. High fever always occurs at the same time as high blood pressure. In other embodiments, a different relationship between clinical conditions may apply.

The training circuitry 44 trains the first model, second model and third model using the temporal hierarchy between periods of high blood pressure, high fever and heart failure. The first model, second model and third model are trained using a cyclical training method similar to that described above with reference to FIG. 11. In a first stage of a cycle, the first model is trained alone. In a second stage of the cycle, the first and second model and trained together. In a third stage of the cycle, all three models are trained together. A training process repeats the cycle of training until convergence is reached.

The inference circuitry 46 applies the trained first model, trained second model and trained third model to a data set relating to an individual patient as illustrated in FIG. 12. The data set comprises vital sign time-series data 240, laboratory data 242, text data 244 and image data 246.

The trained first model, trained second model and trained third model analyze the data set to obtain a plurality of features. Features are illustrated in FIG. 12 by elements 252 along time-axis 250. Features 252 may be arranged by feature type.

The first model outputs a period 260 of high blood pressure, which is indicated in FIG. 12 by a first box 260 having a first length along time axis 250.

An output of the second model is multiplied with the output of the first model to obtain a period 262 of high fever, which is indicated in FIG. 12 by a second box 262 having a second length along time axis 250.

An output of the third model is multiplied with the outputs of the first model and second model to obtain a period 264 of heart failure, which is indicated in FIG. 12 by a third box 264 having a third length along time axis 250.

A length of the period 264 of heart failure is less than a length of the period 262 of high fever. The period 264 of heart failure is contained within the period 262 of high fever.

A length of the period 262 of high fever is less than a length of the period 260 of high blood pressure. The period 262 of high fever is contained within the period 260 of high blood pressure.

The temporal hierarchy between the period 260 of high blood pressure, the period 262 of high fever and the period 264 of heart failure is imposed by the training of the first, second and third models.

In the embodiment of FIG. 12, symptoms manifest in a particular hierarchical order. Heart failure occurs within a period of high fever, which occurs within a period of high blood pressure. This hierarchical order may be specific to a specific disease. For this disease, and for data sets acquired from subjects having this disease, using the approach of FIG. 12 may be suitable. In other embodiments and in other diseases, a different hierarchy of symptoms may be present.

Figure 13:
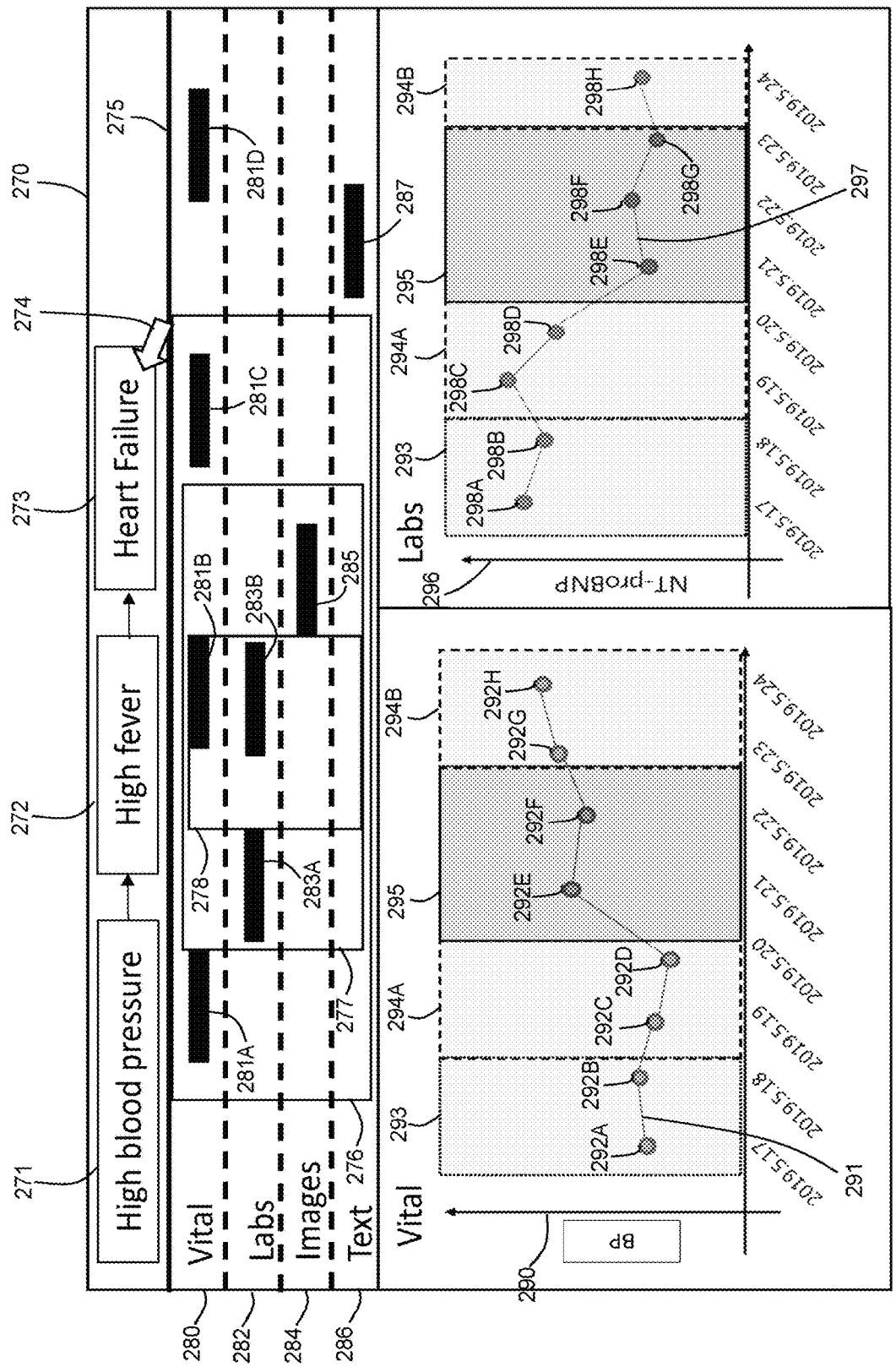
FIG. 13 shows an example of a user interface in accordance with an embodiment.

FIG. 13 shows an example of a user interface 270 for displaying results of analysis of time-series data that has been performed using models that are trained using a temporal hierarchy between outputs. The user interface 270 of FIG. 13 displays the outputs obtained in FIG. 12.

The user interface 270 comprises three selectable elements 271, 272, 273 that are indicative of high blood pressure, high fever and heart failure respectively. A user may select one or more of the selectable elements. A user selection is represented in FIG. 13 by arrow 274. In response to the user's selection of selectable element 271, the user interface circuitry 48 may highlight aspects of the display that relate to high blood pressure. In response to the user's selection of selectable element 272, the user interface circuitry 48 may highlight aspects of the display that relate to high fever. In response to the user's selection of selectable element 273, the user interface circuitry 48 may highlight aspects of the display that relate to heart failure.

The user interface 270 comprises a timeline display 275. The timeline display 275 represents time from left to right. The timeline display comprises four rows 280, 282, 284, 286. A set of blocks 281, 283, 285, 287 represent information acquired at particular times. Rather than a continuous timeline of data, information such as text reports, images, and laboratory results may be obtained as parcels of data, each relating to a limited period of time.

Row 280 is representative of vital signs data. Each of blocks 281A, 281B, 281C and 281D represents a respective period of time for which a respective parcel of vital signs data was collected.

Row 282 is representative of laboratory data. Each of blocks 283A, 283B represents a respective period of time for which a respective parcel of laboratory data was collected.

Row 284 is representative of image data. Block 285 represents a period of time for which a parcel of image data was collected.

Row 286 is representative of text data. Block 287 represents a period of time for which a parcel of text data was collected.

Periods of high blood pressure, high fever, and heart failure are determined by the inference circuitry 46 using the first, second and third trained models as described above.

The user interface 48 displays the determined period of high blood pressure as a first box 276 overlaying all of the rows 280, 282, 284, 286 of the timeline display 275.

The user interface 48 displays the determined period of high fever as a second box 277 overlaying all of the rows 280, 282, 284, 286 of the timeline display 275.

The user interface 48 displays the determined period of heart failure as a third box 278 overlaying all of the rows 280, 282, 284, 286 of the timeline display 275.

On viewing the timeline display 275, a user may see which data was collected within the periods of high blood pressure, high fever and/or heart failure. The user may choose to view any of the collected data. For example, in some embodiments, the user may select any of the blocks 281A to 218D, 283A, 283B, 285 or 287 to obtain further information about the data corresponding to the selected block.

In FIG. 13, vital signs data is further illustrated in a vital signs plot 290. The vital signs plot 290 comprises a line 291 indicating a trend in a vital signs measurement. The line 291 connects multiple data points 292A to 292H.

Overlaid on the vital signs plot 290 are a plurality of colored regions 293, 294A, 294B, 295 representing periods of high blood pressure, high fever and/or heart failure.

Region 293 is colored green and is represented in FIG. 13 by a dotted outline. Region 293 indicates a period of high blood pressure in which neither high fever nor heart failure are present.

Regions 294A and 294B are colored yellow and are represented in FIG. 13 by dashed outlines. Regions 294A, 294B indicate periods of high fever in which heart failure is not present. In accordance with the temporal hierarchy of symptoms, high blood pressure is present when high fever is present. Therefore, high blood pressure is present in the periods of regions 294A, 294B.

Region 295 is colored red and is represented in FIG. 13 by a solid outline. Region 295 indicates a period of heart failure. In accordance with the temporal hierarchy of symptoms, high blood pressure and high fever are also present when heart failure is present. Therefore, high blood pressure and high fever are present in the period of region 295.

In FIG. 13, laboratory data is further illustrated in a laboratory data plot 296. Plot 296 comprises a line 297 indicating a trend in a laboratory measurement. The line 297 connects multiple data points 298A to 2928H.

Colored regions 293, 294A, 284B, 295 are overlaid on plot 296 in the same way as they are overlaid on plot 290.

By overlaying regions indicating periods in which high blood pressure, high fever and/or heart failure occur, a user may more easily identify which measurements were obtained in the presence of which symptoms. For example, a user may distinguish measurements obtained when the patient was in heart failure from measurements obtained when the patient was not in heart failure.

The timeline of FIG. 13 and the plots of FIG. 13 may each assist a user, for example a clinician, in interpreting data obtained from the patient. The user may be assisted in relating individual data points or data sets with periods of high blood pressure, high fever and/or heart failure.

The user may use the display of FIG. 13 to review the determinations of the periods of high blood pressure, high fever and heart failure that were made by the inference circuitry 46. For example, the user may use their clinical judgement to see whether they agree with the periods determined by the inference circuitry 46.

In the embodiment of FIGS. 12 and 13, periods of high blood pressure, high fever and heart failure are determined. In other embodiments, time periods relating to any suitable clinical conditions may be determined. For example, a clinical condition may be any suitable symptom.

In some embodiments, a temporal hierarchy is used in the context of time-series imaging of the heart. For example, in some embodiments, a first model analyzes an input-time series and distinguished periods of ventricular diastole and ventricular systole in the cardiac cycle. A second model may be constrained to operate within the diastole phase. The second model may detect when arterial contraction occurs. A third model may be constrained to the systole phase. The third model may identify when ventricular ejection occurs.

In the embodiment of FIGS. 12 and 13, the models learn to determine time periods associated with clinical conditions based on input data comprising a combination of vital signs data, laboratory data, image data, and text data. By using a combination of different types of data, a more complete picture of the patient's condition may obtained. In some circumstances, certain types of data may be available for time periods in which other types of data are not available.

In other embodiments, models may be trained to determine time periods based on any suitable type or types of data. For example, in some embodiments, models may be trained to determine time periods based only on vital signs data. In some embodiments, models may be trained to determine time periods based on a combination of vital signs data and image data.

In further embodiments, models may be trained to perform tasks relating to objects, for example to anatomical structures, based on a combination of image data and at least one further type of data, for example text data.

In some embodiments, models are trained to perform tasks relating to objects and also to perform tasks relating to time periods. Outputs of the models may have both a spatial hierarchy and a temporal hierarchy.

In embodiments described above, outputs of models are multiplied together to provide a combined output. In other embodiments, any method of combining model outputs may be used. A method in which models are joined may be weighted. The combination of models may not be a multiplication. For example, a softer weighting may be used. For example, the softer weighting may comprise applying a proportion or probability rather than the hard constraint of multiplication.

In some embodiments, some levels in a hierarchy may not always reside entirely within other levels of the hierarchy. For example, for some patients the conditions of fever, high blood pressure and high pressure may not be fully temporally coincident.

A spatial hierarchy may be present in which one object is mostly, but not fully, included within another object. A temporal hierarchy may be present in which one time period is mostly, but not fully, included within another time period. A spatial hierarchy may be present in which one object is usually, but not always, included within another object. A temporal hierarchy may be present in which one time period is usually, but not always, included within another time period.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A processing apparatus comprising:
processing circuitry configured to:
apply a first trained model to input data to obtain a first output based on the input data, wherein the input data comprises clinical data; and
apply a second trained model different than the first trained model to the input data to obtain a second output based on the input data,
wherein the first trained model is trained to obtain the first output and the second trained model is trained to obtain the second output in dependence on a hierarchical relationship between the first output and the second output, the hierarchical relationship comprising at least one of: a spatial hierarchy, a temporal hierarchy, an anatomical hierarchy, and a hierarchy of clinical conditions, such that a boundary of the second output is included within a boundary of the first output or a time extent of the second output is included within a time extent of the second output.

2. The apparatus according to claim 1, wherein the input data comprises medical image data.

3. The apparatus according to claim 1, wherein the first output relates to a first object, the second output relates to a second object, and the hierarchical relationship between the first output and the second output comprises a spatial hierarchy in which the second object is included within a boundary of the first object.

4. The apparatus according to claim 3, wherein the first object comprises a first anatomical structure and the second object comprises a second anatomical structure.

5. The apparatus according to claim 1, wherein the first output comprises a first time period associated with a first type of clinical condition, the second output comprises a second time period associated with a second type of clinical condition, and the hierarchical relationship between the output and the second output comprises a temporal hierarchy in which the second time period is included within the first time period.

6. The apparatus according to claim 1, wherein:
   a) a process of training the first model and the second model comprises providing feedback to the first model when an output of the second model is incorrect, or
   b) the processing circuitry is configured to multiply the first output and the second output to obtain a combined output.

7. The apparatus according to claim 1, wherein
   c) the processing circuitry is further configured to apply at least one additional first trained model to the input data, wherein the obtaining of the first output comprises combining an output of the first trained model with an output of the additional first trained model, or
   d) the processing circuitry is further configured to apply at least one additional second trained model to the input data, wherein the obtaining of the second output comprises combining an output of the second trained model with an output of the additional second trained model.

8. The apparatus according to claim 1, wherein the processing circuitry is further configured to display the first output and/or the second output and/or the combined input on a display screen.

9. A processing method comprising:
   applying a first trained model to input data to obtain a first output based on the input data, wherein the input data comprises clinical data; and
   applying a second trained model different than the first trained model to the input data to obtain a second output based on the input data,
   wherein the first trained model is trained to obtain the first output and the second trained model is trained to obtain the second output in dependence on a hierarchical relationship between the first output and the second output, the hierarchical relationship comprising at least one of: a spatial hierarchy, a temporal hierarchy, an anatomical hierarchy, and a hierarchy of clinical conditions, such that a boundary of the second output is included within a boundary of the first output or a time extent of the second output is included within a time extent of the second output.

10. A processing apparatus comprising:
    processing circuitry configured to perform a training process comprising:
    training a first model to obtain a first output from input data, wherein the input data comprises clinical data, and
    training a second model different than the first model to obtain a second output from the input data;
    wherein training of the first model and training of the second model is in dependence on a hierarchical relationship between the first output and the second output, the hierarchical relationship comprising at least one of: a spatial hierarchy, a temporal hierarchy, an anatomical hierarchy, and a hierarchy of clinical conditions, such that a boundary of the second output is included within a boundary of the first output or a time extent of the second output is included within a time extent of the second output.

11. The apparatus according to claim 10, wherein the input data comprises medical image data.

12. The apparatus according to claim 10, wherein
    e) the first output relates to a first anatomical structure, the second output relates to a second anatomical structure, and the hierarchical relationship between the first output and the second output comprises a spatial hierarchy in which the second anatomical structure is included within a boundary of the first anatomical structure, or
    f) the first output comprises a first time period associated with a first type of clinical condition, the second output comprises a second time period associated with a second type of clinical condition, and the hierarchical relationship between the first output and the second output comprises a temporal hierarchy in which the second time period is included within the first time period.

13. The apparatus according to claim 10, wherein the training process comprises alternating between g) and h):
    g) training the first model in isolation, and
    h) jointly training the first model and the second model.

14. The apparatus according to claim 13, wherein:
    i) the joint training of the first model and the second model comprises joining an output of the first model and an output of the second model by a multiplication operation to obtain a combined input, or
    j) the joint training of the first model and the second model comprises providing feedback to the first model when an output of the second model is incorrect.

15. The apparatus according to claim 10, wherein the training of the first model to obtain a first output from input data comprises training the first model to perform a first task; the training of the second model to obtain a second output from the input data comprises training the second model to perform a second task; and the first task and/or the second task comprises at least one of: pixel- or voxel-level classification, segmentation, bounding box regression, region detection, image level classification.

16. The apparatus according to claim 10, wherein the training of the first model is performed using a first training data set and the training of the second model is performed using a second, different training data set, and
    wherein the first training data set comprises data that is labelled with ground truth values for the first output, and the second training data set comprises data that is labelled with ground truth values for the second output.

17. The apparatus according to claim 10, wherein the processing circuitry is further configured to pre-train the first model and/or the second model.

18. The apparatus according to claim 10, wherein the processing circuitry is further configured to train at least one further model to obtain at least one further output from the input data, wherein the training of the at least one further model is in dependence on a hierarchical relationship between the first output, the second output, and the at least one further output.

19. The apparatus according to claim 10, wherein the processing circuitry is further configured to train at least one additional first model to obtain the first output and/or the processing circuitry is further configured to train at least one additional second model to obtain the second output.

20. A method for training a first model and a second model using a training process, the training process comprising:
    training the first model to obtain a first output from input data, wherein the input data comprises clinical data; and
    training the second model different from the first model to obtain a second output from the input data;
    wherein training of the first model and training of the second model is in dependence on a hierarchical relationship between the first output and the second output, the hierarchical relationship comprising at least one of: a spatial hierarchy, a temporal hierarchy, an anatomical hierarchy, and a hierarchy of clinical conditions, such that a boundary of the second output is included within a boundary of the first output or a time extent of the second output is included within a time extent of the second output.

* * * * *